US010599376B2

(12) United States Patent
Kubota

(10) Patent No.: US 10,599,376 B2
(45) Date of Patent: Mar. 24, 2020

(54) IMAGE FORMING APPARATUS, METHOD OF CONTROLLING THE SAME, AND STORAGE MEDIUM CONFIGURED TO ACCEPT A USER OPERATION FOR DELETING A PAGE FORM A PRINT JOB, TO DELETE A RENDERING COMMAND FOR THAT PAGE, AND TO UPDATE IDENTIFICATION INFORMATION OF THE PRINT JOB BASED ON THE DELETED PAGE

(71) Applicant: CANON KABUSHIKI KAISHA, Tokyo (JP)

(72) Inventor: Tomohide Kubota, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/167,894

(22) Filed: Oct. 23, 2018

(65) Prior Publication Data

US 2019/0138257 A1    May 9, 2019

(30) Foreign Application Priority Data

Nov. 6, 2017    (JP) ................................. 2017-214189

(51) Int. Cl.
G06F 3/12    (2006.01)

(52) U.S. Cl.
CPC .......... *G06F 3/1267* (2013.01); *G06F 3/1205* (2013.01); *G06F 3/1238* (2013.01); *G06F 3/1256* (2013.01); *G06F 3/1258* (2013.01); *G06F 3/1274* (2013.01)

(58) Field of Classification Search
CPC combination set(s) only.
See application file for complete search history.

(56) References Cited

U.S. PATENT DOCUMENTS

| 10,116,826 | B1* | 10/2018 | Ravikiran | H04N 1/2166 |
| 2009/0316171 | A1* | 12/2009 | Kurihara | H04N 1/00204 |
| | | | | 358/1.9 |
| 2014/0033090 | A1* | 1/2014 | Yamada | G06F 3/0484 |
| | | | | 715/764 |

(Continued)

FOREIGN PATENT DOCUMENTS

JP    4033857 B2    1/2008
JP    2013-225256 A    10/2013

*Primary Examiner* — Helen Zong
(74) *Attorney, Agent, or Firm* — Venable LLP

(57) ABSTRACT

A printing apparatus predicts a processing time of rendering processing for each page of a print job, determines one or more pages for which page image data is to be generated in advance based on the predicted processing time, generates the page image data corresponding to the determined one or more pages, and stores correspondence information in association with the print job, the correspondence information associating the generated page image data with identification information identifying a location of a page. In response to accepting a user operation for deleting one or more specified pages from the print job, the printing apparatus deletes a rendering command for constructing the one or more specified pages from the print job, and updates the identification information included in the correspondence information based on the one or more specified pages.

18 Claims, 23 Drawing Sheets

(56) References Cited

U.S. PATENT DOCUMENTS

2014/0189396 A1\* 7/2014 Miyahara ............... G06F 1/325
                                                      713/320
2017/0192724 A1\* 7/2017 Kim ..................... G06F 3/1213

\* cited by examiner

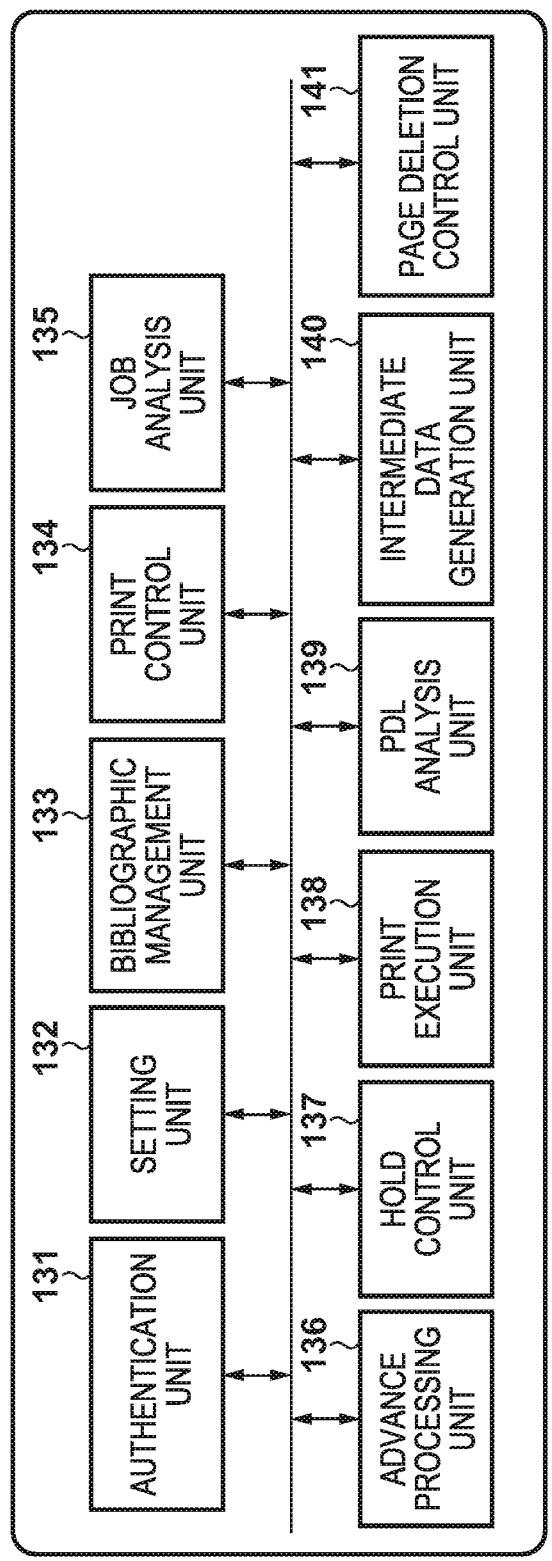

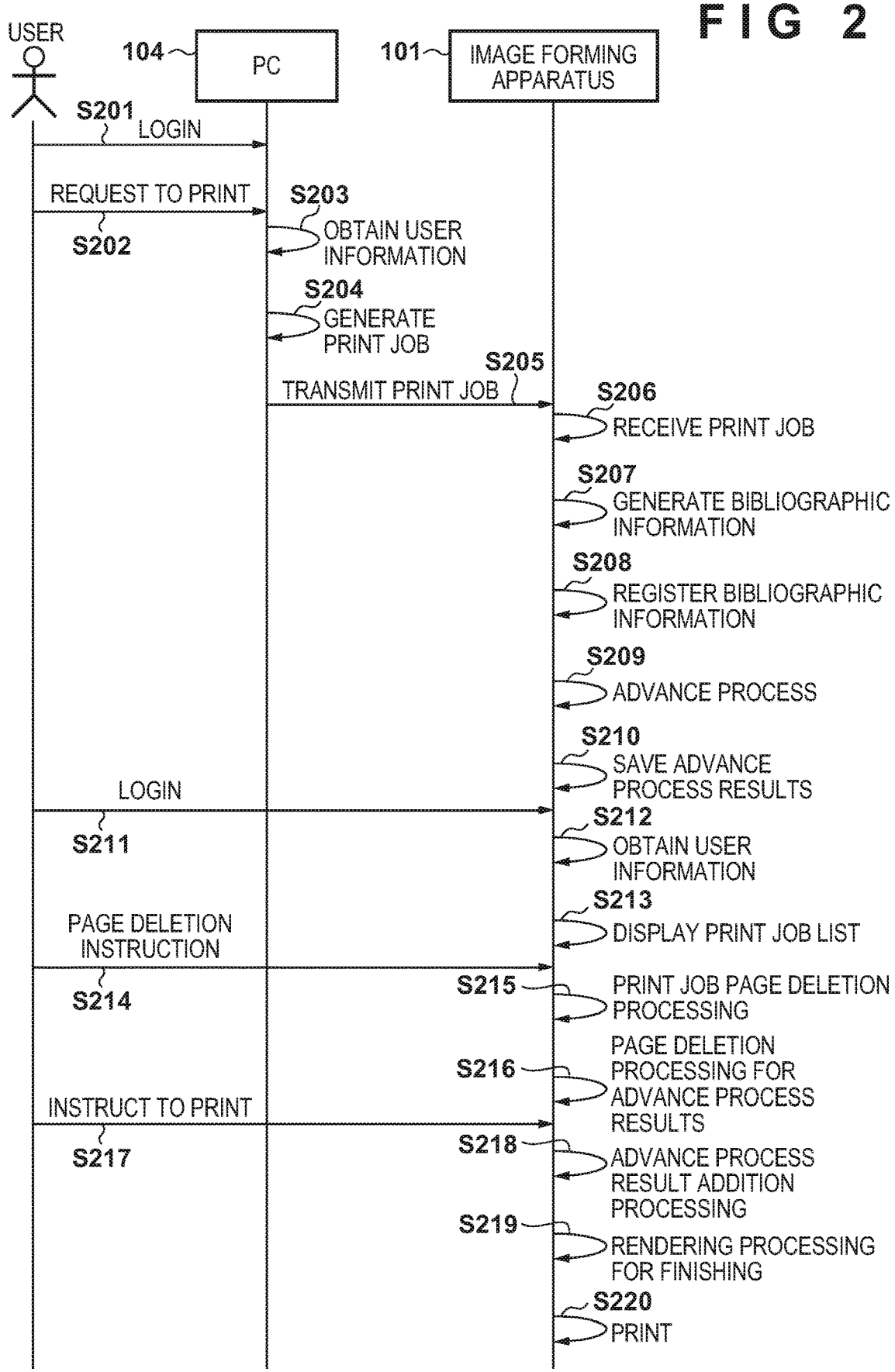

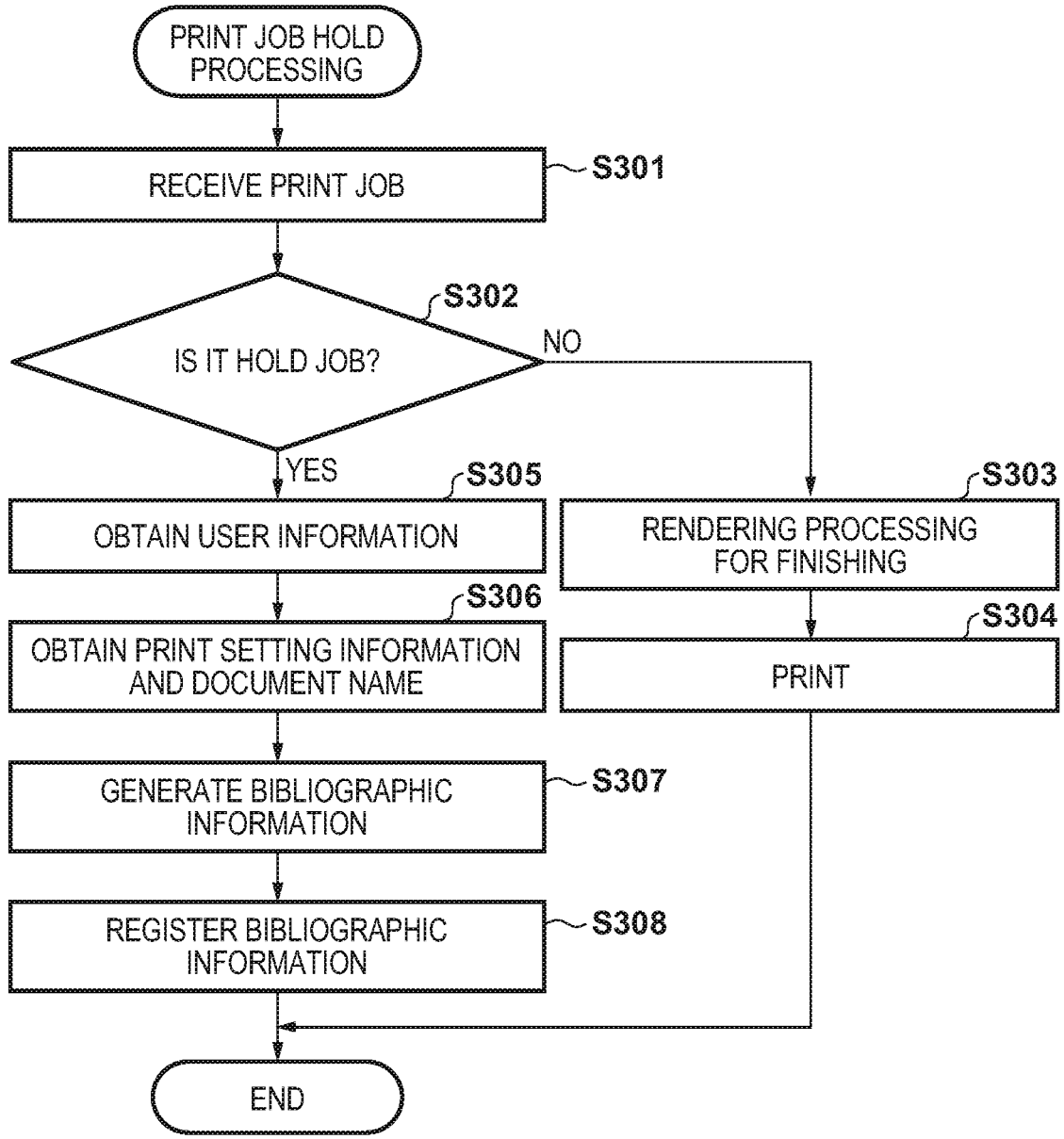

FIG 3B

HEADER INFORMATION)
DOCUMENT NAME: DOCUMENT1.pptx
USER NAME: USER A
COLOR MODE: MONOCHROME
PRINT MODE: ONE-SIDED
SHEET SIZE: A4

INFORMATION OF PAGE 1)
P1 = [A, B]
Line1 =  x1, y1), x'1, y'1)
Text1 =  size=12), x2, y2), "ABC")
Rect1 =  x3, y3), x'3, y'3)
Image1 =  x4, y4)
Rect2 =  x5, y5), x'5, y5)

INFORMATION OF PAGE 2)

..

INFORMATION OF PAGE 9)

INFORMATION OF PAGE 10)

FIG. 3C

<USER A: BIBLIOGRAPHIC INFORMATION>

| JOB ID | FILE INFORMATION | PRINT SETTING INFORMATION | NUMBER OF PAGES | PREDICTED AMOUNT OF TIME FOR RENDERING | ADVANCE PROCESS INFORMATION |
|---|---|---|---|---|---|
| 1 | FILE NAME: DOCUMENT1.pptx SAVE DESTINATION: 101 | COLOR MODE: BLACK AND WHITE PRINT MODE: ONE SIDED SHEET SIZE: A4 ... | 10 | PAGE 1: 12.8 SEC PAGE 2: 1.1 SEC ... PAGE 9: 11.7 SEC PAGE 10: 0.6 SEC | ADVANCE PROCESSING: COMPLETED ADVANCE PROCESS RESULT: /xxx/yyy/image1 /xxx/yyy/image9 |
| 2 | FILE NAME: DOCUMENT2.xlsx SAVE DESTINATION: 101 | COLOR MODE: COLOR PRINT MODE: DOUBLE-SIDED SHEET SIZE: A4 ... | 5 | PAGE 1: 0.6 SEC PAGE 2: 0.7 SEC PAGE 3: 50.2 SEC PAGE 4: 1.1 SEC PAGE 5: 8.1 SEC | ADVANCE PROCESSING: NOT YET ADVANCE PROCESS RESULT: ... |

FIG. 6
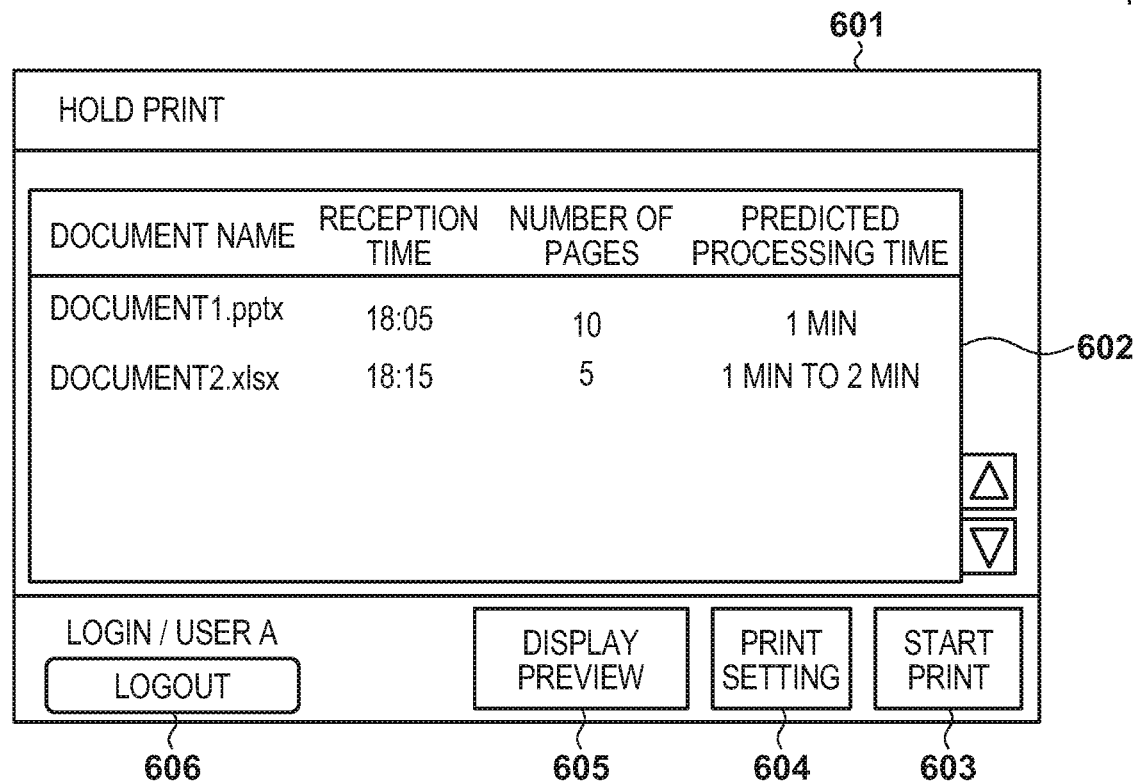
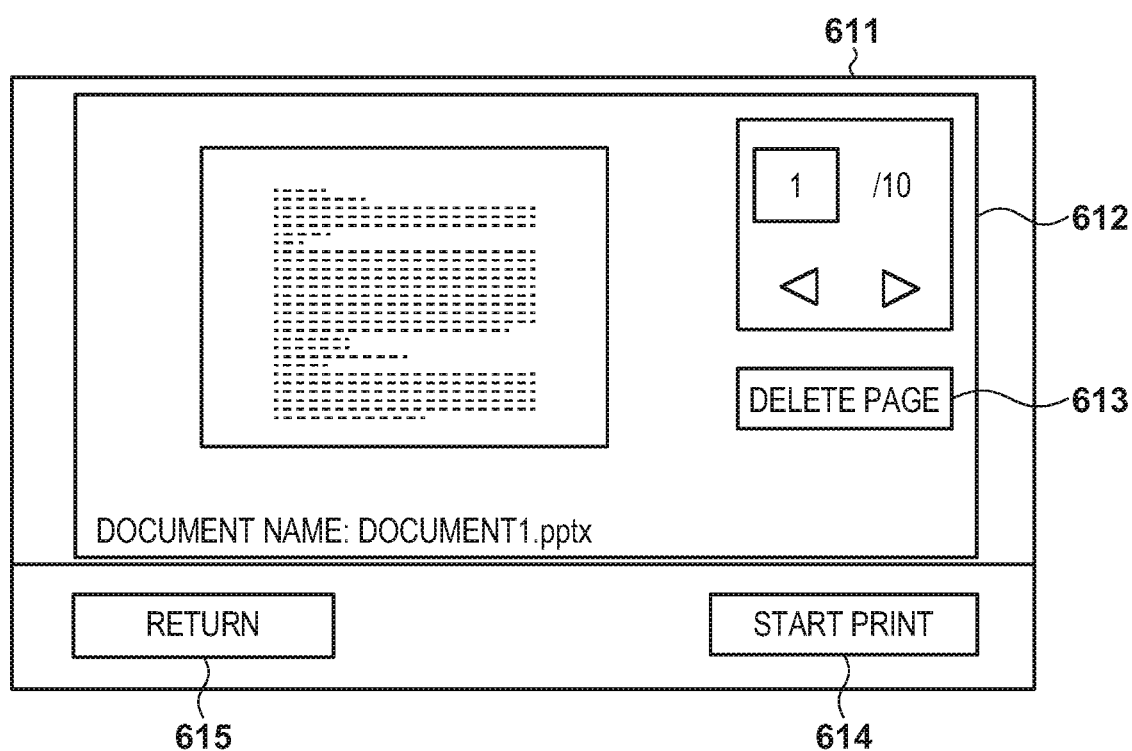

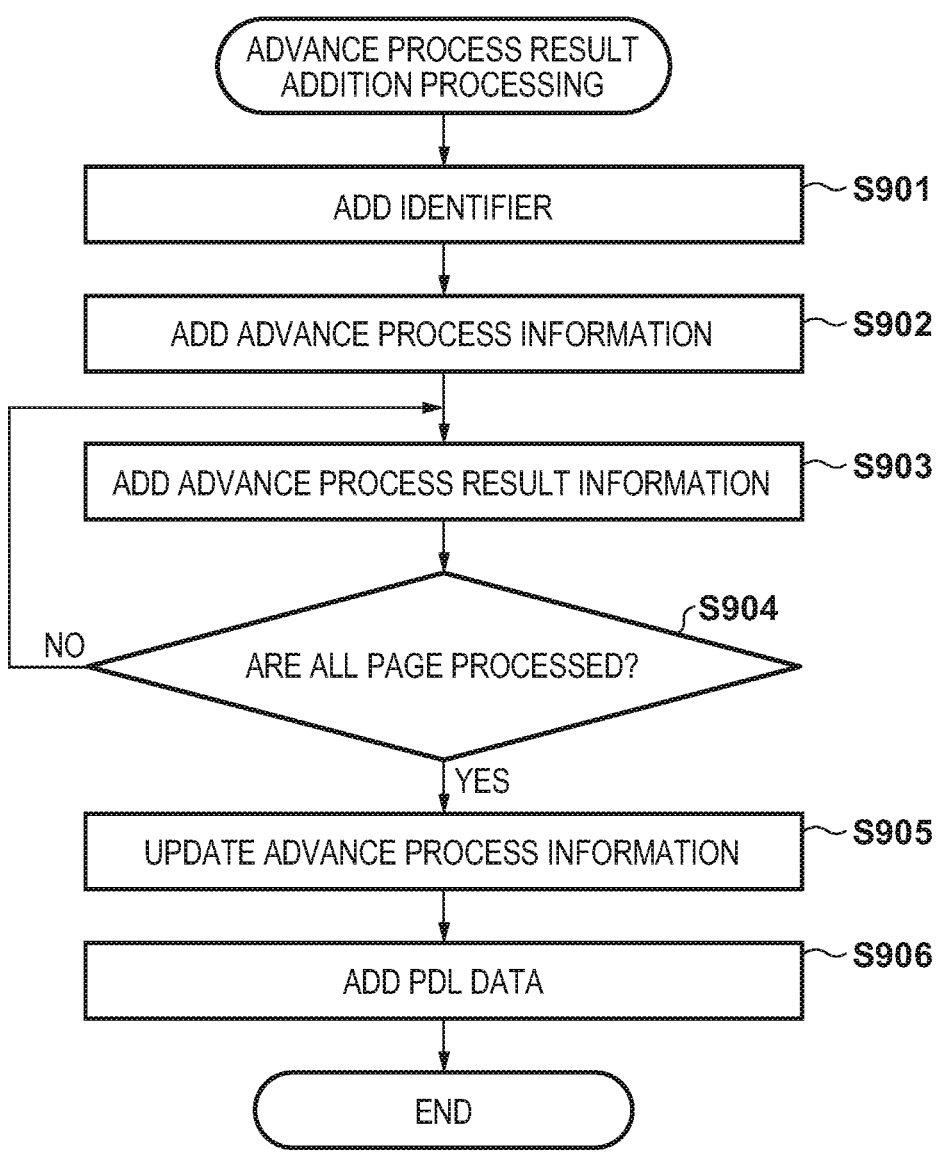

FIG. 10A

ADVANCE PROCESS RESULT

- IDENTIFIER — 1001
- ADVANCE PROCESS RESULT DATA SIZE
  TOTAL NUMBER OF PAGES=10
  ADVANCE PROCESS PAGE =[1,9]
  INDEX [1]
  INDEX [9] — 1002
- PAGE NUMBER =1
  FORMAT=FILE PATH
  FILE PATH =/xx/yy/image1
  PAGE NUMBER=9
  FORMAT=FILE PATH
  FILE PATH =/xx/yy/image9 — 1003

PDL DATA

- PDL PAGE 1)
  PDL PAGE 2)
  ....
  PDL PAGE 9)
  PDL PAGE 10) — 1004

FIG. 10B

ADVANCE PROCESS RESULT

- IDENTIFIER — 1011
- ADVANCE PROCESS RESULT DATA SIZE
  TOTAL NUMBER OF PAGES=10→9
  ADVANCE PROCESS PAGE =[1,9]
  INDEX [1]
  INDEX [9] — 1012
- PAGE NUMBER =1
  FORMAT=FILE PATH
  FILE PATH =/xx/yy/image1
  PAGE NUMBER=9
  FORMAT=FILE PATH
  FILE PATH =/xx/yy/image9 — 1013

PDL DATA

- ~~PDL PAGE 1)~~
  PDL PAGE 2→1)
  ....
  PDL PAGE 9→8)
  PDL PAGE 10→9) — 1014

F I G. 11A

<USER A: BIBLIOGRAPHIC INFORMATION>

1101

| JOB ID | FILE INFORMATION | PRINT SETTING INFORMATION | NUMBER OF PAGES | PREDICTED AMOUNT OF TIME FOR RENDERING | ADVANCE PROCESS INFORMATION | PAGE MANAGEMENT INFORMATION |
|---|---|---|---|---|---|---|
| 1 | FILE NAME: DOCUMENT1.pptx SAVE DESTINATION:101 | COLOR MODE: BLACK AND WHITE PRINT MODE: ONE SIDED SHEET SIZE: A4 ... | 10 | PAGE 1: 12.8 SEC PAGE 2: 1.1 SEC ... PAGE 9: 11.7 SEC PAGE 10: 0.6 SEC | ADVANCE PROCESSING: COMPLETED ADVANCE PROCESS RESULT: /xx/yy/imageA /xx/yy/imageI | TABLE-JOB1 |
| 2 | FILE NAME: DOCUMENT2.pptx SAVE DESTINATION:101 | COLOR MODE: COLOR PRINT MODE: DOUBLE-SIDED SHEET SIZE: A4 ... | 5 | PAGE 1: 0.6 SEC PAGE 2: 0.7 SEC PAGE 3: 50.2 SEC PAGE 4: 1.1 SEC PAGE 5: 8.1 SEC | ADVANCE PROCESSING: NOT YET ADVANCE PROCESS RESULT: ... | TABLE-JOB2 |

FIG 11B

<TABLE - JOB 1>

| PAGE 1 | ID:A |
|---|---|
| PAGE 2 | ID:B |
| PAGE 3 | ID:C |
| PAGE 4 | ID:D |
| PAGE 5 | ID:E |
| PAGE 6 | ID:F |
| PAGE 7 | ID:G |
| PAGE 8 | ID:H |
| PAGE 9 | ID:I |
| PAGE 10 | ID:J |

FIG. 14A <TABLE - JOB 1>

| | |
|---|---|
| ~~PAGE 1~~ | ~~ID:A~~ |
| PAGE 2 | ID:B |
| PAGE 3 | ID:C |
| PAGE 4 | ID:D |
| PAGE 5 | ID:E |
| PAGE 6 | ID:F |
| PAGE 7 | ID:G |
| PAGE 8 | ID:H |
| PAGE 9 | ID:I |
| PAGE 10 | ID:J |

FIG. 14B <TABLE - JOB 1>

| | |
|---|---|
| PAGE 1 | ID:B |
| PAGE 2 | ID:C |
| PAGE 3 | ID:D |
| PAGE 4 | ID:E |
| PAGE 5 | ID:F |
| PAGE 6 | ID:G |
| PAGE 7 | ID:H |
| PAGE 8 | ID:I |
| PAGE 9 | ID:J |

FIG. 14C <TABLE - JOB 1>

| | |
|---|---|
| PAGE 1 | ID:A |
| PAGE 2 | ID:K |
| PAGE 3 | ID:B |
| PAGE 4 | ID:C |
| PAGE 5 | ID:D |
| PAGE 6 | ID:E |
| PAGE 7 | ID:F |
| PAGE 8 | ID:G |
| PAGE 9 | ID:H |
| PAGE 10 | ID:I |
| PAGE 11 | ID:J |

IMAGE FORMING APPARATUS, METHOD OF CONTROLLING THE SAME, AND STORAGE MEDIUM CONFIGURED TO ACCEPT A USER OPERATION FOR DELETING A PAGE FORM A PRINT JOB, TO DELETE A RENDERING COMMAND FOR THAT PAGE, AND TO UPDATE IDENTIFICATION INFORMATION OF THE PRINT JOB BASED ON THE DELETED PAGE

This application claims the benefit of Japanese Patent Application No. 2017-214189, filed on Nov. 6, 2017, which is hereby incorporated by reference herein in its entirety.

BACKGROUND OF THE INVENTION

Field of the Invention

The present invention relates to an image forming apparatus, a method of controlling the same, and a storage medium.

Description of the Related Art

In recent years, accompanying the spread of network environments, it has become common for a plurality of users to share a plurality of image forming apparatuses. In conjunction with this, the desire is growing for "hold printing," in which a print execution is performed after having executed user authentication on an image forming apparatus, so that when highly confidential print material is to be output, it is not seen by another user.

In Japanese Patent No. 4033857 is proposed a technique in which a print job that was transmitted from a host computer is temporarily stored in an image forming apparatus that has a server function, and, when user authentication is performed and a print instruction is made on another image forming apparatus for the stored print job, the print job is executed. In the case of such "hold printing," since the printing is executed after the user authentication, it is necessary for the user to wait for print job rendering processing at the location of the other image forming apparatus. Accordingly, there is a growing desire for shortening of print job rendering processing time in "hold printing."

In Japanese Patent Laid-Open No. 2013-225256 is proposed a technique in which a print time is shortened by using a print job transmission apparatus capable of rendering processing. Specifically, the time for performing rendering processing on the print job transmission apparatus and then transmitting the image data after the processing to an image forming apparatus and the time for transmitting the print job to the image forming apparatus and performing rendering processing on the image forming apparatus are compared, and processing is performed on the apparatus that takes the shorter amount of time. Note that these two different processes are executed simultaneously, and the result of the apparatus that completes such processing sooner is used.

Meanwhile, in response to the desire to further improve operability in relation to image forming apparatuses in recent years, a function is provided in which, prior to printing, an output result thumbnail image (preview image) is displayed on the operation screen of the image forming apparatus. Even with "hold printing," a function in which a thumbnail image for a document held on an image forming apparatus that was designated by a user is displayed, and a particular page can be deleted is known.

There is a problem, however, as is detailed below, in the foregoing conventional technique. From the above described conventional techniques, a configuration can be considered in which, when the above described hold printing is used, for example, two rendering processes for different print jobs are executed after a print instruction is input by a user, and rendering data for which the processing completed earliest is used. In a case in which rendering processing is not executed until after the print instruction is input by the user in this way, even with processing by the method of the shorter of the two rendering processes, depending on the print job, the result will be that the user is made to wait for the output. Also, with such a configuration, since two different rendering processes are simultaneously executed, and the data of the one that completes earliest is selected, the rendering processing for the other one is wasteful.

Accordingly, one could consider, in the image forming apparatus on the server side, performing rendering processing of some of the pages of a held print job in advance and generating a rendering image in advance to thereby shorten the print time. Normally, images that are rendered in advance can be saved such that page numbers for target pages are associated with management numbers. Meanwhile, on an image forming apparatus that has a function by which it is possible to delete a particular page, it is possible to delete some pages of a print job when making a print instruction. In a case in which some pages are deleted in this way, the print job page numbers and the advance rendering image page numbers will end up being shifted, and the output result will not be as the user intends it to be.

SUMMARY OF THE INVENTION

The present invention enables realization of a mechanism by which, in hold printing, the time for print processing from when a print instruction is made by a user is shortened and page numbers of advance rendering images are managed correctly even in a case in which a particular page of a print job is deleted.

In one aspect, the present invention provides an image forming apparatus comprising a storage device configured to store an image formation job, a memory device that stores a set of instructions, and at least one processor that executes the set of instructions to execute, for a job stored in the storage device, image processing in advance of performing image formation, and to store a processing result, which is advance process information, in association with the job stored in the storage device, to accept setting information related to image formation for the job stored in the storage device, to delete, if an instruction to delete a page is included in the accepted setting information related to image formation, image formation data of a corresponding page in the job stored in the storage device, and, in accordance with the deleted page, to update the advance process information stored in the storage device.

In another aspect, the present invention provides a method of controlling an image forming apparatus comprising a storage device configured to store an image formation job, the method comprising executing, for a job stored in the storage device, image processing in advance of performing image formation, and storing a processing result, which is advance process information, in association with the job stored in the storage device, accepting setting information related to image formation for the job stored in the storage device, deleting, if an instruction to delete a page is included in the accepted setting information related to image formation, image formation data of a corresponding page in the job stored in the storage device, and, in accordance with the deleted page, updating the advance process information stored in the storage device.

In still another aspect, the present invention provides a non-transitory computer-readable storage medium storing a program for causing a computer to execute each step of a method of controlling an image forming apparatus comprising a storage device configured to store an image formation job, the method comprising executing, for a job stored in the storage device, image processing in advance of performing image formation, and storing a processing result, which is advance process information, in association with the job stored in the storage device, accepting setting information related to image formation for the job stored in the storage device, deleting, if an instruction to delete a page is included in the accepted setting information related to image formation, image formation data of a corresponding page in the job stored in the storage device, and, in accordance with the deleted page, updating the advance process information stored in the storage device.

Further features of the present invention will be apparent from the following description of exemplary embodiments with reference to the attached drawings.

BRIEF DESCRIPTION OF THE DRAWINGS

FIGS. 1A and 1B are views illustrating an example of a system configuration according to an embodiment.

FIG. 2 is a sequence illustrating a print process flow according to an embodiment.

FIGS. 3A to 3C are views for describing print job hold processing according to an embodiment.

FIG. 6 is a view for describing a user interface (UI) screen for print execution processing according to an embodiment.

FIG. 9 is a flowchart for describing advance process result addition processing according to an embodiment.

FIGS. 10A to 10D are views for describing a print job after adding an advance process result according to an embodiment.

FIGS. 11A and 11B are views for describing print job hold processing according to an embodiment.

FIGS. 14A to 14C are views for describing page management information according to an embodiment.

DESCRIPTION OF THE EMBODIMENTS

Preferred embodiments of the present invention will now be described in detail with reference to the drawings. It should be noted that the relative arrangement of the components, the numerical expressions, and the numerical values set forth in these embodiments do not limit the scope of the present invention unless it is specifically stated otherwise.

First Embodiment

System Hardware Configuration

Figure 1A:
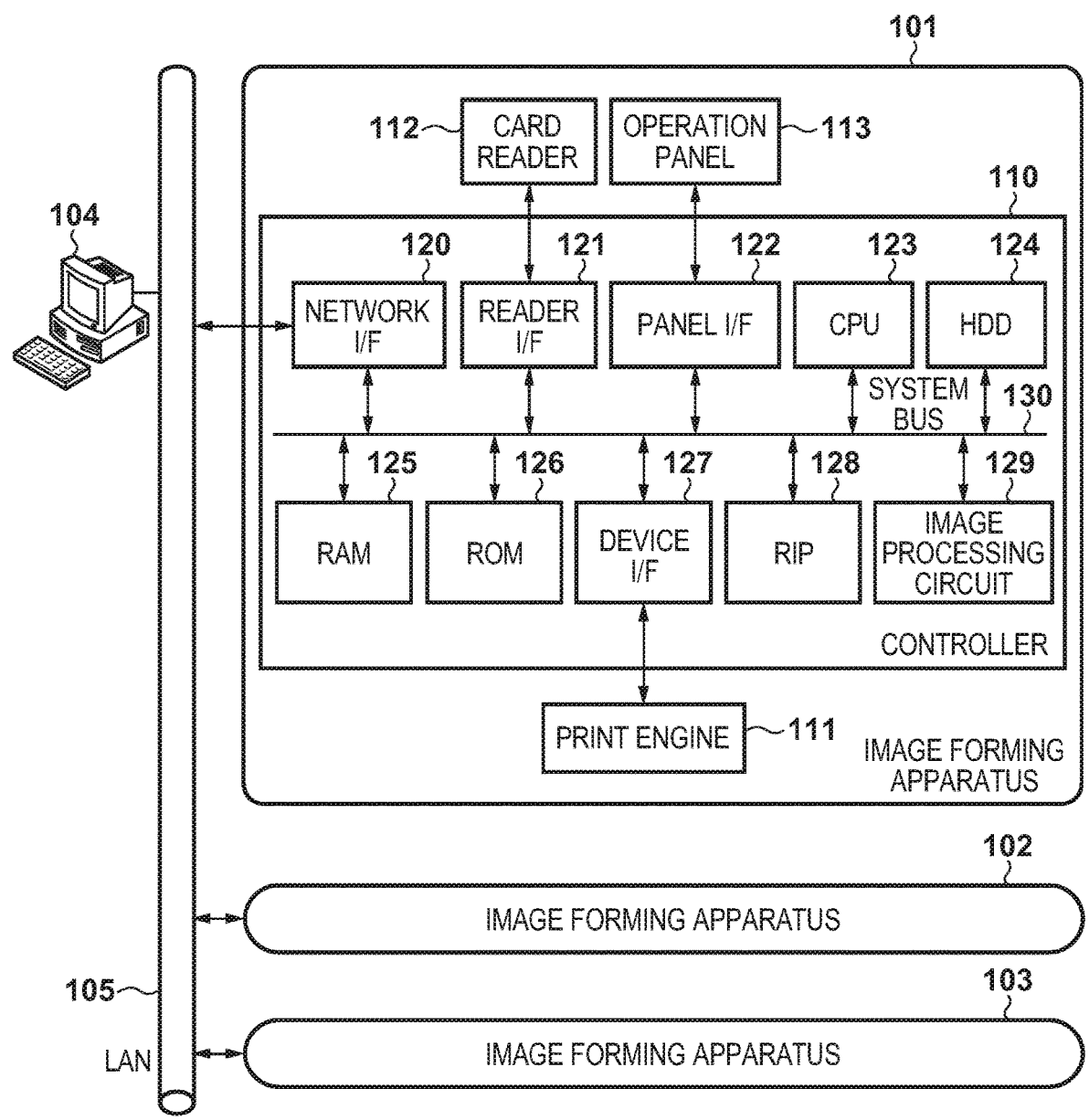

A description is given below regarding a first embodiment of the present invention, with reference to the attached drawings. FIG. 1A illustrates an example of a hardware configuration of a print system that includes an image forming apparatus of the present embodiment. Image forming apparatuses 101 to 103 may all be printers, such as a multi-function printer (MFP), a single function printer (SFP), and a laser beam printer (LBP). The image forming apparatuses 101 to 103 may be printing apparatuses for which hold printing is possible. Also, the print methods of the image forming apparatuses 101 to 103 are not limited. Also, while an example of three image forming apparatuses is illustrated in the system of FIG. 1A, a configuration that includes one or more image forming apparatuses may be employed.

Each of the image forming apparatuses 101 to 103 is connected with a host computer (PC) 104 that makes various instructions via an Ethernet, a local area network (LAN) 105, or the like. The image forming apparatuses 101 to 103 execute processing in accordance with the content of print instructions from the PC 104. Note that in a case in which a plurality of image forming apparatuses are connected via the LAN 105, as in the configuration illustrated in FIG. 1A, it is possible for the image forming apparatus to accept a print job from another image forming apparatus and to execute the print processing. Note that since the image forming apparatuses 101 to 103 have similar configurations, the configuration of the image forming apparatus 101 will be described below as representative thereof, and a description of the configurations of the other image forming apparatuses 102 and 103 will be omitted. Below, the configurations described using the image forming apparatus 101 are similar for the image forming apparatuses 102 and 103.

The image forming apparatus 101 comprises a controller 110, a print engine 111, a card reader 112, and an operation panel 113. Also, the controller 110 comprises hardware including a network interface (I/F) 120, a reader I/F 121, a panel I/F 122, a central processing unit (CPU) 123, a hard disk drive (HDD) 124, a random access memory (RAM) 125, a read only memory (ROM) 126, a device I/F 127, a raster image processor (RIP) 128, and an image processing circuit 129. These components can transmit/receive signals to each other over a system bus 130.

The controller 110 comprehensively controls the entirety of the image forming apparatus 101 based on a program that is stored in the ROM 126 or the HDD 124. The network I/F 120 is realized by a LAN card, for example, and input and output of information with external apparatuses is performed by connecting to the LAN 105. The reader I/F 121 is an interface unit for the card reader 112 that accepts authentication information from an external unit, and handles the role of accepting input authentication information from the external unit and conveying it to the CPU 123. The panel I/F 122 is an interface unit for the operation panel (display unit) 113, which has a display screen that can display various menus, print job information, and the like. The panel I/F 122 outputs operation screen data to the operation panel 113. Also, the panel I/F 122 handles the role of conveying to the CPU 123 information that an operator input from the operation panel 113.

The CPU 123 is a central processing unit for controlling the image forming apparatus 101 overall. The HDD 124 is a storage apparatus, such as a hard disk drive, and stores the system software for various processing, input print jobs, image data, and the like. The RAM 125 is a system work memory that the CPU 123 operates, and is an image memory for temporarily storing input print jobs, image data, and the like. The ROM 126 is a boot ROM, and a boot program of the system is stored therein. The CPU 123 realizes various control that will be described later by reading programs stored in the ROM 126 or the HDD 124 into the RAM 125 as necessary and executing them.

The device I/F 127 connects the print engine 111 and the controller 110 and performs synchronous/asynchronous transformation of image data. The RIP 128, which is a raster image processor, analyzes intermediate data (a display list) and expands it into an image. The image processing circuit 129 performs correction according to the print engine 111 and processing, such as a resolution transformation, on image data generated by analyzing a print job.

The print engine 111 executes printing in accordance with an instruction by the controller 110. In other words, the print engine 111 forms an image on a sheet (such as a recording sheet) based on print data. The card reader 112 has a function in which information such as an identification (ID) card of a user can be read and notifies the user information (authentication information), which is read from an ID card to the controller 110. The operation panel 113 accepts operation screen data from the controller 110, displays a screen based on the accepted data, accepts an operation instruction from a user, and notifies it to the controller 110.

Software Arrangement

Next, a software configuration of the controller 110, which controls the operations of the image forming apparatuses 101 to 103 according to the present embodiment, will be described with reference to FIG. 1B. The controller 110 includes an authentication unit 131, a setting unit 132, a bibliographic management unit 133, a print control unit 134, a job analysis unit 135, an advance processing unit 136, a hold control unit 137, a print execution unit 138, a page description language (PDL) analysis unit 139, an intermediate data generation unit 140, and a page deletion control unit 141. The units 131 to 141 are functional units that are realized by the CPU 123 reading programs stored in the ROM 126 or the HDD 124 into the RAM 125 as necessary and executing programs.

The authentication unit 131 accepts authentication information through the system bus 130 from the reader I/F 121, and notifies it to the hold control unit 137. The setting unit 132 performs control of input/output from/to the operation panel 113 through the system bus 130 via the panel I/F 122. The bibliographic management unit 133 controls print jobs that the hold control unit 137 received and information related to the print jobs. The print control unit 134 obtains a print instruction input through the network I/F 120 and information of a print job, and instructs the hold control unit 137 and the print execution unit 138 to perform print job processing. The job analysis unit 135 performs analysis of a print job that the hold control unit 137 received.

The advance processing unit 136, in accordance with an analysis result by the job analysis unit 135 for a print job that the hold control unit 137 received, executes print job rendering processing in advance. Here, the print job rendering processing being executed in advance means that the print job is executed in advance of accepting an actual print instruction for the print job.

The hold control unit 137 performs print job analysis and management for a print job accepted from the print control unit 134, advance process control, print instruction to the print execution unit 138, and page deletion instruction to the page deletion control unit 141. The print execution unit 138 generates an image by performing control of the PDL analysis unit 139, the intermediate data generation unit 140, the RIP 128, and the image processing circuit 129 in respect to a print job accepted by the print control unit 134 and the hold control unit 137. Furthermore, the print execution unit 138 notifies the generated image to the print engine 111 through the device I/F 127, and causes it to execute print processing.

The PDL analysis unit 139 performs PDL analysis of a print job for which an instruction was accepted from the print execution unit 138. The intermediate data generation unit 140 generates intermediate data based on information that the PDL analysis unit 139 analyzed. The page deletion control unit 141 executes page deletion processing for deleting a corresponding page of a print job for which an instruction was accepted from the hold control unit 137.

Sequence

Next, with reference to FIG. 2, a description will be given of a sequence for when a print system comprising the image forming apparatuses 101 to 103 according to the present embodiment receives a print job from the PC 104 and prints it on the image forming apparatus 101.

In step S201, the PC 104 executes user login processing in accordance with input from the user, and accepts a request to print data from an arbitrary application according to the user input in step S202. Continuing on, the PC 104, in step S203, obtains user information, in step S204, generates a print job by adding the obtained user information to a print job, and, in step S205, transmits the generated print job to the image forming apparatus 101.

When, in step S206, the image forming apparatus 101 receives a print job, it saves the received print job in the HDD 124. Then, in step S207, the image forming apparatus 101 extracts the user information that was added to the print job and generates bibliographic information, and, in step S208, saves the generated bibliographic information in the HDD 124. Continuing on, when, in step S209, the image forming apparatus 101 finishes saving (holding) the bibliographic information, it starts an advance process, and, in step S210, it consecutively saves the results of the advance process in the HDD 124. Here, the advance process is an advance rendering process on at least a portion of the image data included in the print job, and the results thereof indicate advance rendering data.

Next, in step S211, the image forming apparatus 101 executes user login processing in accordance with input from the user. Note that if the user login destination is the image forming apparatus 102 or 103, the processing by the image forming apparatus 101 from step S211 may be executed on that image forming apparatus. The user input here may be information that is obtained by reading an ID card of the user by the card reader 112. Continuing on, in step S212, the image forming apparatus 101 obtains user information from the user input of step S211, and, in step S213, displays a print job list for that user on the operation panel 113. Specifically, the image forming apparatus 101 displays, on the operation panel, list information for print jobs held in association with the obtained user information. Note that when something in the displayed print job list is selected in accordance with the user input, the image forming apparatus 101 may display on the operation panel 113 a preview image for each page of the selected print job.

Next, in step S214, the image forming apparatus 101 accepts an instruction, from the user via the operation panel 113, to delete a page from a preview image for the print job being displayed on the operation panel 113. When a page deletion instruction is accepted from a user, in step S215, the image forming apparatus 101 executes deletion processing on the corresponding page of the selected print job, and once again saves the print job after the corresponding page deletion in the HDD 124. Continuing on, in step S216, the image forming apparatus 101 aligns the advance process result saved in step S210 (for example, advance rendering data) with the page deletion result of step S215, and performs updating or deletion.

Next, when, in step S217, the image forming apparatus 101 receives a print instruction from the user, in step S218, it adds the saved result of the advance process to the print job. After that, in step S219, the image forming apparatus 101 uses the advance process result of the print job, to which the advance process result was added, to execute rendering processing for finishing, and in step S220, performs printing and finishes the processing.

Hold Processing

Next, with reference to FIGS. 3A to 3C, a processing procedure for print job hold processing that software (133 to 140) that each controller 110 of the image forming apparatuses 101 to 103 of the present embodiment comprises executes will be described. FIG. 3A illustrates a processing procedure for a print job hold process that the controller 110 executes. FIG. 3B illustrates an example of configuration of a print job that the image forming apparatus receives. FIG. 3C illustrates a user print job list that the controller 110 stores in the HDD 124. The processing described below is realized by, for example, the CPU 123 reading a control program that is stored in the ROM 126 or the HDD 124 into the RAM 125 and executing the program.

In step S301, the print control unit 134 receives a print job transmitted from the PC 104, or the like, through the network I/F 120. The print job is as in FIG. 3B, for example, and has header information including various initial setting information for the data, and is configured so that the data of each page (PDL data) is included thereafter. P1, Line1, Text1, and the like, in the information of each page are examples of drawing commands for configuring a page.

In step S302, the print control unit 134 determines whether to hold the print job received in step S301 or to simply print it. The method of determining whether to hold the job may be to indicate a hold by a parameter stored in the image forming apparatus, to analyze information embedded in the header of the print job, or the like. In the case of simply printing, the processing advances to step S303, and in the case of holding, the processing advances to step S305.

In step S303, the print execution unit 138 controls the PDL analysis unit 139 and the intermediate data generation unit 140 to performs analysis of the print job, and to generate image data by causing rendering processing to be executed by the RIP 128 on the generated intermediate data. Continuing on, in step S304, the print execution unit 138, after the image data generated in step S303 is corrected by the image processing circuit 129, transfers the data to the print engine 111 through the device I/F 127, thereby causing the data to be printed, and ends the processing.

Meanwhile, in step S305, the hold control unit 137 obtains the user information included in the print job. In the example of FIG. 3B, the user information is indicated by "USER NAME: USER A," but this user information need not be included in the header information of the print job, and the configuration may be such that the user information is sent separately from the transmission origin PC 104. The user information may be anything that is information by which it is possible to identify the user who executed the print, such as a user name or a user ID.

In step S306, the job analysis unit 135 obtains the print setting information and the document name included in the received print job. In this print setting information, for example, information indicating whether it is single-sided printing or double-sided printing, information as to whether to print in color or to print in monochrome (black and white), information regarding the sheet size to output, or the like, is included. FIG. 3B is only one example, and print data may lack some of the print setting information, and a configuration may be such that in that case, an initial setting value held in the HDD 124 or the ROM 126 is used or a value is set by the user when printing is executed.

In step S307, the hold control unit 137 associates the user information obtained in step S305 and the print setting information and document name obtained in step S306. Then, the hold control unit 137 makes this associated information one record, and adds it to the bibliographic information corresponding to the user information. FIG. 3C illustrates one example of bibliographic information of a user A. Here, the bibliographic information of the user A is exemplified. The bibliographic information of the present embodiment comprises, for example, a job ID, file information, print setting information, a number of pages, a predicted amount of time for rendering, and advance process information. Note that in the job ID, a unique value is set for each job. In the file information, a file name and a save destination are included. In the print setting information, a color mode is included, and information as to whether to print in black and white or color is included. In the number of pages, the total number of pages of the print job is included. In the predicted amount of time for rendering a predicted amount of time required for rendering is included. In the advance process information, information as to whether or not an advance process, for example, an advance rendering process, has been processed, and if it has been processed, a save destination for the processing result is included.

In step S308, the bibliographic management unit 133 saves in the HDD 124 the bibliographic information to which the one record was added in step S307, and ends the processing. Also, the hold control unit 137 saves the above-described print job in the HDD 124 as the print job corresponding to the one record that was added this time. Note that upon registration of the bibliographic information of step S308, the predicted amount of time for rendering is not yet set, and for the advance process information, advance processing is registered as "not yet" and the advance processing result is in an unset state.

Advance Rendering Process

Figure 4:
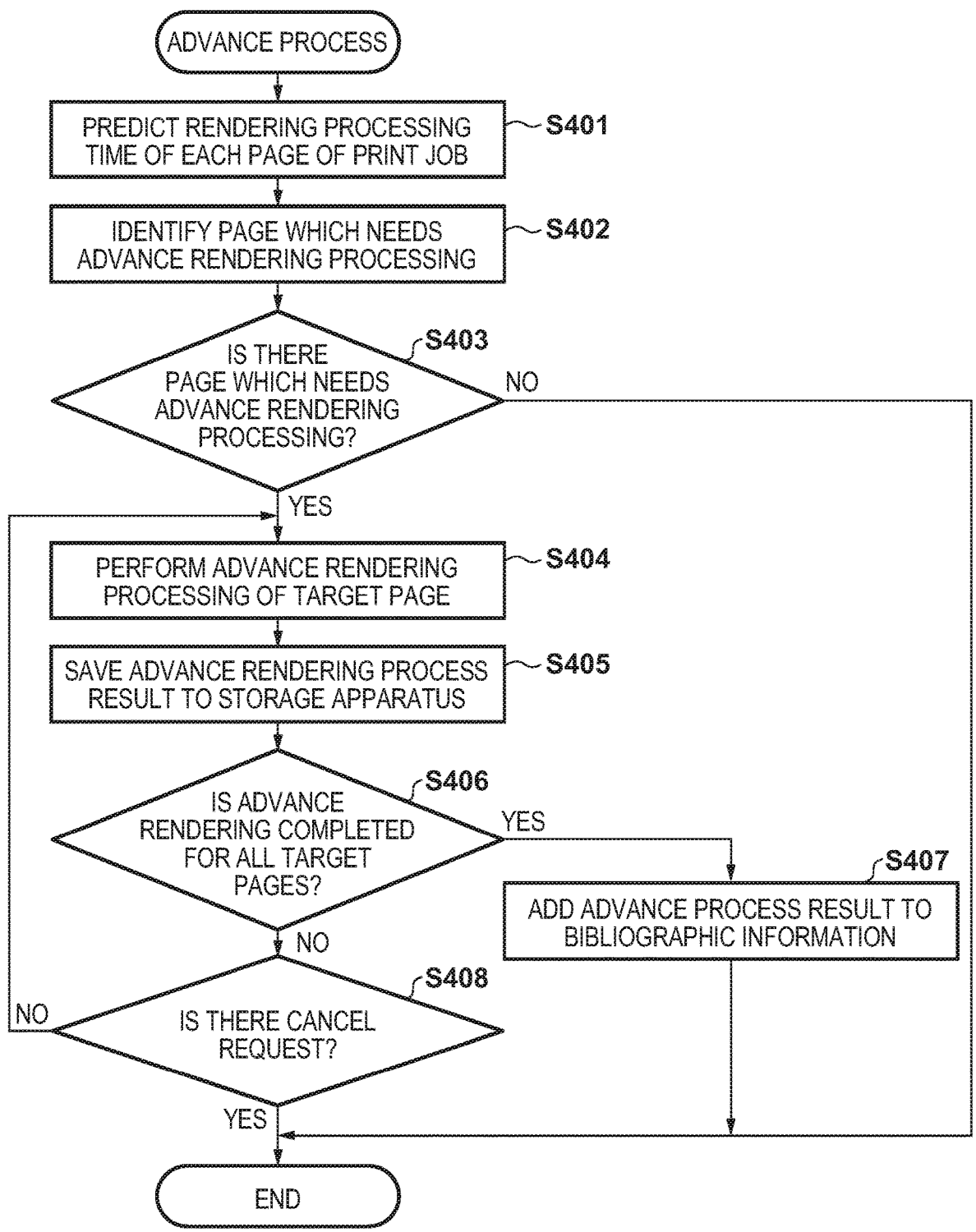
FIG. 4 is a flowchart for describing an advance process according to an embodiment.

Next, with reference to FIG. 4, a processing procedure for advance rendering processing that software (reference numerals 135, 136, or the like) that each controller 110 of the image forming apparatuses 101 to 103 according to the present embodiment comprises executes will be described. This advance process is processing that is executed after a print job is held in the HDD 124 by the print job hold processing of FIGS. 3A to 3C. Note that here, an example of executing rendering processing is described as an example of an advance process, but there is no intention to limit the present invention, and another advance process that is executed at the time of printing may be executed. The processing described below is realized by, for example, the CPU 123 reading a control program that is stored in the ROM 126 or the HDD 124 into the RAM 125 and executing the program.

In step S401, the job analysis unit 135 predicts the time that it will take for rendering processing on each page included in the print job in relation to the print job held in the HDD 124. The prediction method may be any method that can predict the rendering processing time for the print job size or the PDL command content, or the like, included in the print job. Note that the job analysis unit 135 instructs the bibliographic management unit 133, and registers the prediction result in bibliographic information associated with the print job on which the advance process is being performed. The prediction result is information not yet registered in the foregoing step S308.

In step S402, the advance processing unit 136 determines, as the result of the prediction of step S401, pages for which it will take a comparatively long time for rendering processing out of the pages included in the print job as pages for which it is necessary to execute the rendering processing in advance. For example, the predicted amount of time for rendering of the document "job ID: 1" is as in FIG. 3C. In this case, the advance processing unit 136 determines that the pages that will take a long time are page 1 and page 9. The criteria for determining that a page will take a long time may be determined in accordance with the printing speed of the image forming apparatus that performs the printing. Also, a threshold that the advance processing unit holds (for example, "10 seconds") may be used, and it may be determined that rendering is necessary for all pages. In other words, the advance processing unit 136 predicts in units of pages the time needed for rendering from the PDL data included in the print job, and decides the pages on which to perform the advance process based on the results of the prediction. Note that, the predicted amount of time for rendering may be predicted based on the size of the PDL data of the page for which the prediction is being made, and, for example, may be predicted based on the number and types of PDL commands included in the page, or may be predicted using another method.

In step S403, as the result of the determination of step S402, the advance processing unit 136 determines whether or not there is a page for which advance rendering processing is necessary. If there is, the processing advances to step S404, and, if not, this processing is ended.

In step S404, the advance processing unit 136 executes rendering processing (advance rendering processing) for the pages determined to require advance rendering processing in step S402, and thereby generates image data. In step S402, in a case in which there are multiple pages for which it is determined that advance rendering processing is necessary, execution may be in the page order of the print job, and execution may be started with the pages for which more time will be taken for rendering processing, and execution may be started with the pages for which less time will be taken for rendering processing.

Next, in step S405, the advance processing unit 136 saves in the HDD 124 image data (advance rendering data) generated in step S404. Image data in units of saved pages is associated with bibliographic information associated with the print job for which the advance process is being performed, and is managed associably with each page of the print job. In step S406, the advance processing unit 136 determines whether the advance rendering processing for all of the pages determined to require advance rendering processing in step S402 has ended. If the rendering processing for all of those pages has ended, the processing advances to step S407, and, if not, the processing advances to step S408.

In step S407, the advance processing unit 136 instructs the bibliographic management unit 133, and adds the advance process information indicating that the result of executing the advance rendering process in the foregoing step S405 is saved to the corresponding bibliographic information. For example, as in the advance process information in the bibliographic information of FIG. 3C, the information "done" as to whether or not the advance process has completed, and the information "/xxx/yyy/image1" and "/xxx/yyy/image9," and the like, regarding the location of the results of the advance process are stored are added. In the example of the document "JOB ID: 1," since an advance processing image is generated for the 1st page and the 9th page, the file name of the image data is linked to the corresponding page number. Here, the page number is information indicating the order of pages in the print job.

Meanwhile, in step S408, the advance processing unit 136 determines whether there is a cancel request for the advance process in relation to the print job for which the rendering processing is being executed. The cancel request is generated upon acceptance of a print execution instruction corresponding to the corresponding print job or an instruction, such as a page deletion instruction. If there is no cancel request, the processing advances to step S404, the advance rendering processing for the next page is transitioned to, and, if there is a cancel request, this processing is ended. Note that processing such as subsequent print execution or page deletion will be described later.

Print Execution Processing

Figure 5A:
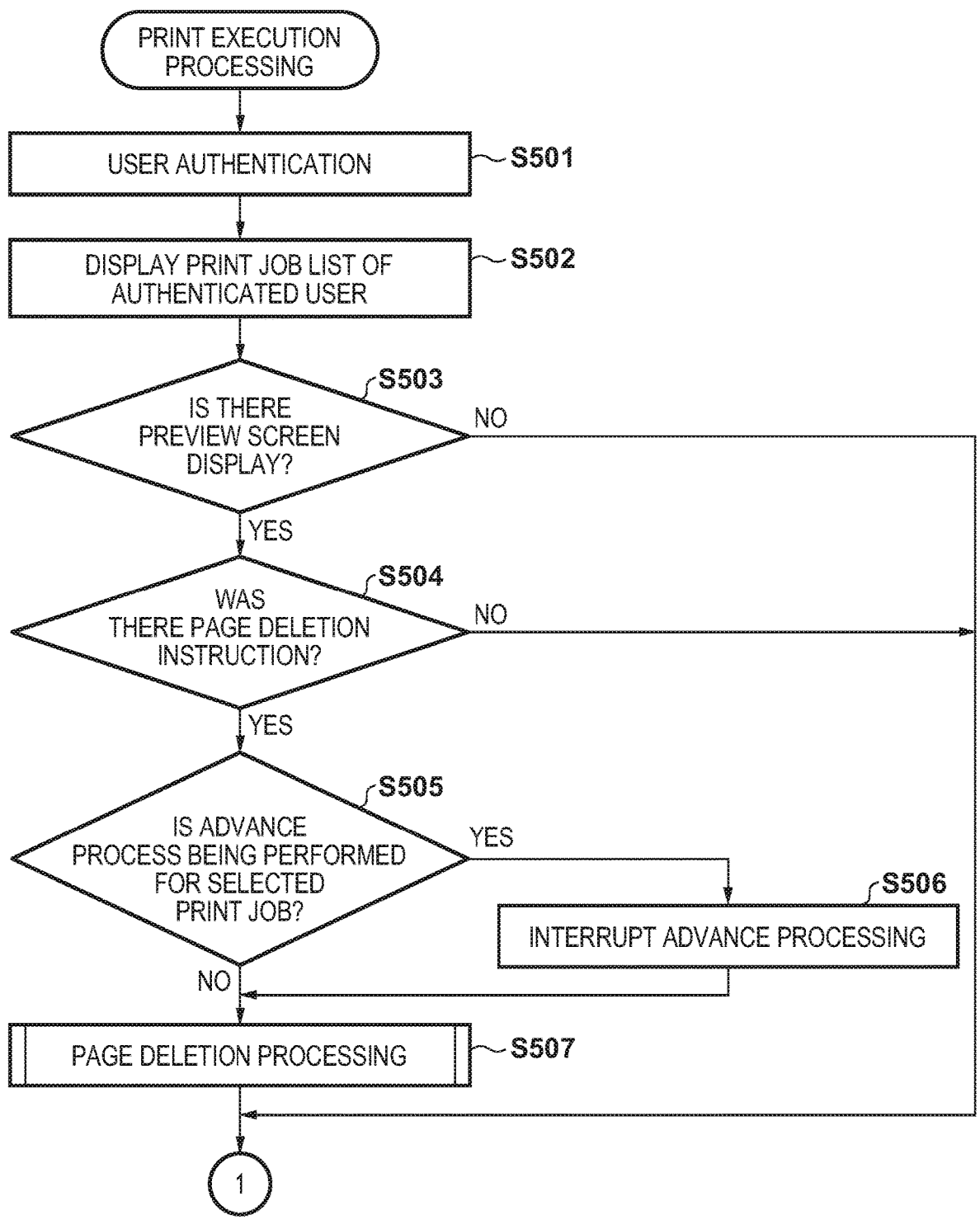
FIGS. 5A and 5B are flowcharts for describing a print execution processing according to an embodiment.
Figure 5B:
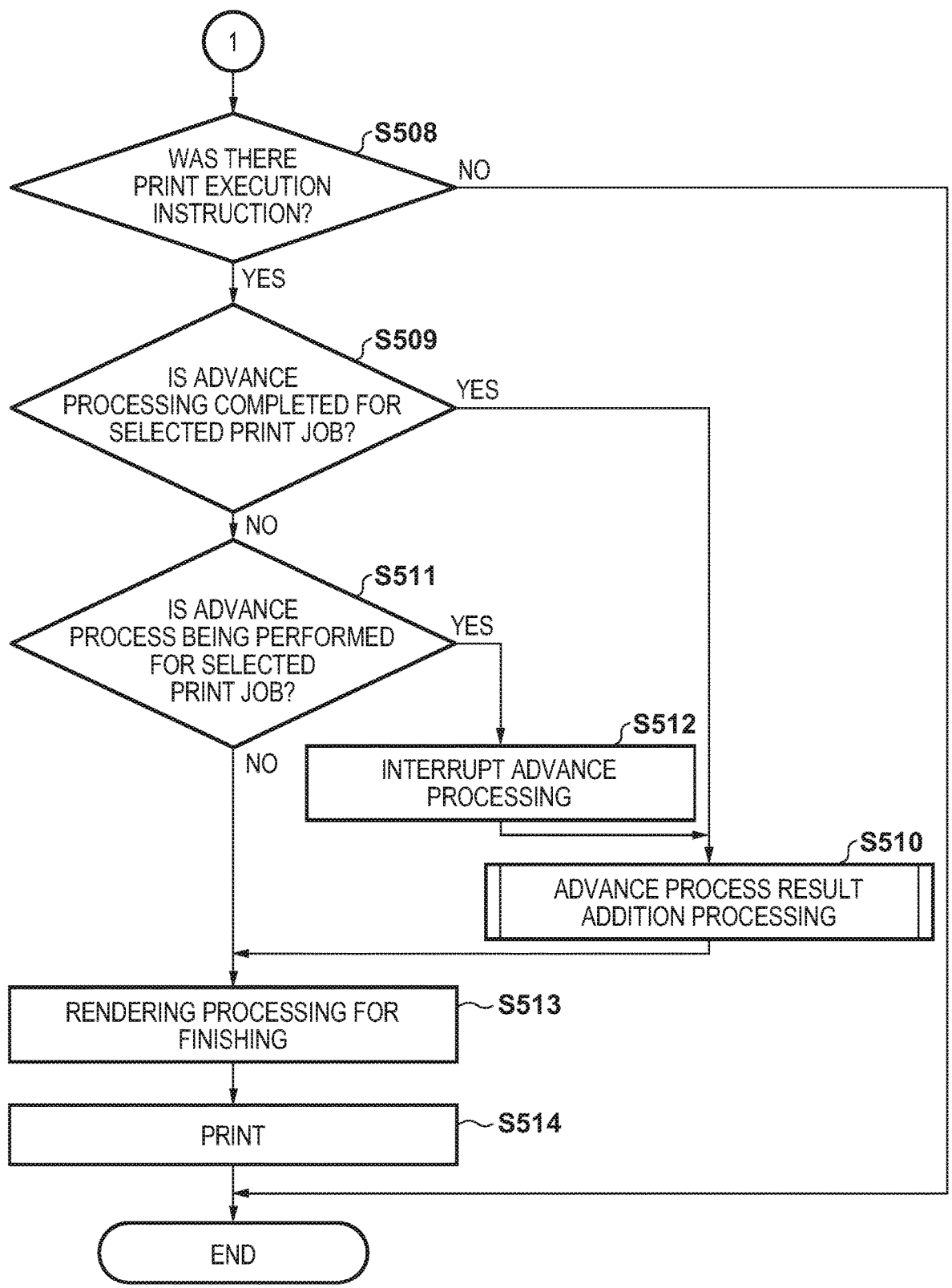

Next, with reference to FIGS. 5A and 5B, a description will be given for a processing procedure for print execution processing that software (reference numerals 131, 132, 137, 138, and 141) that the controller 110 of the image forming apparatuses 101 to 103 of the present embodiment comprises executes. FIG. 6 illustrates an example of a user interface (UI) displayed on the operation panel 113 after user authentication. The processing described below is realized by, for example, the CPU 123 reading a control program that is stored in the ROM 126 or the HDD 124 into the RAM 125 and executing the program.

In step S501, in a case in which an ID card of the user is held up to the card reader 112, the authentication unit 131 accepts user information that the card reader 112 read from the ID card through the reader I/F 121, and executes authentication processing. An example in which user information is read from the ID card of the user is given, but a known authentication method, such as one in which user information and a password are input from the operation panel 113 and user authentication is performed, may be used. In the case of success in the authentication processing, the authentication unit 131 notifies the user information to the setting unit 132.

In step S502, the setting unit 132 accepts from the bibliographic management unit 133 bibliographic information corresponding to the user information that is the same as the user information obtained in step S501, and, based on that bibliographic information, generates a list of held print jobs. Furthermore, the setting unit 132 performs a display to the operation panel 113 through the panel I/F 122. The information displayed on the operation panel 113 is indicated in reference numeral 601 of FIG. 6, for example, and the print job list is displayed as in the example of reference numeral 602. For example, as indicated in the print job list 602, for each print job, information of the document name, the document reception time, the number of pages, and the predicted processing time is displayed. The user, based on this information, can select a desired print job from the print job list 602, and make a print instruction for the selected print job by pressing a start print button 603. Also, the user can select a desired print job from the print job list 602, and, by pressing a print setting button 604, can change the print settings for the selected print job. Also, the user can select a desired print job from the print job list 602, and, by pressing a display preview button 605, display a preview image for the selected print job. The preview image will be described later using reference numeral 611. Note that a user who is logged in can log out by a logout button 606.

In step S503, the setting unit 132 determines whether there was a preview display instruction from the user for a print job that is being displayed in the print job list 602. In other words, it is determined whether or not the display preview button 605 was pressed. If there was a display preview instruction, the preview screen is displayed on the operation panel 113, and the processing advances to step S504, and, if not, the processing advances to step S508. The preview screen displayed on the operation panel 113 is denoted by reference numeral 611 in FIG. 6, for example, and the preview display screen for the corresponding print job is selectably displayed as in reference numeral 612. The user can confirm a preview image of the document by operating in the screen of reference numeral 612, and can make an instruction to delete a page being displayed by pressing a delete page button 613. Accordingly, the panel I/F 122 here is one example of an accepting unit. Since image data in a print job is deleted when a delete instruction is made, in a case in which a print instruction is made thereafter, the page is not printed. Also, it is possible to make a print instruction for a print job being displayed in the preview by pressing a print start button 614, and it is possible to return to the print job list screen 601 by pressing a back button 615.

Note that the present invention is not limited to the foregoing control and various changes are possible. For example, in the above described preview screen 611, a preview screen for all pages is displayed, but a configuration may be such that pages for which the advance process has already been executed are displayed to be grayed out and controlled to be unselectable. By this configuration, it is possible to prevent misalignment in the page order. Also, even in the case of displaying the preview screen so that all pages can be selected, in a case in which a page for which the advance processing has already been executed is selected, a pop-up may be displayed to warn the user that advance rendering data is already being held.

In step S504, the setting unit 132 determines whether there was a page deletion instruction from the user for the print job that is being preview-displayed. If there is a page deletion instruction, the processing advances to step S505, and, if the user cancels (presses the back button 615) the preview display, the processing advances to step S508. A page deletion instruction means that, for example, the user operated the delete page button 613.

In step S505, the hold control unit 137 determines whether or not an advance process is being performed for the print job for which the page deletion instruction was made. This determination may be a determination as to whether or not an advance process is being performed by referencing registered bibliographic information as illustrated in FIG. 3C, and it may be a determination as to whether or not image data for which advance rendering processing was already performed that is associated with the bibliographic information in step S405 of FIG. 4 exists. If an advance process is being performed for the print job, the processing advances to step S506, and, if not, the processing advances to step S507.

In step S506, the hold control unit 137 interrupts the advance process for the print job for which the advance process is being performed. Information for interrupting the advance process is notified to the advance processing unit 136, and is used for the determination as to whether or not there is a cancel request as described in step S408 of FIG. 4. The advance processing unit 136 saves as advance process information the result of the advance process saved in the HDD 124 at the point in time when the advance process was interrupted, and adds it to the corresponding bibliographic information.

In step S507, a page deletion control unit 141 executes page deletion processing for the print job for which the page deletion instruction was made. Here, the page deletion control unit 141 deletes data of the corresponding page in the print job, and updates the information of the advance process result that is saved as advance process information. Details of the page deletion processing will be described later using FIG. 7.

In step S508, the setting unit 132 determines whether there was a print execution instruction from the user for a print job that is being displayed in the print job list 602. If there is a print execution instruction, the processing advances to step S509, and, if there is no print execution instruction, the user cancels the authentication state and ends this processing. The print instruction means that the user operated (pressed) the start print button 603, for example. Cancelling the authentication state means that, for example, the user operated the logout button 606.

In step S509, the setting unit 132 notifies that the print execution instruction was made to the hold control unit 137. The hold control unit 137 determines whether or not the advance process for the print job for which the print execution instruction was made has completed. This determination is made by referencing the bibliographic information and obtaining information of whether the advance process was already performed which was added in step S407 of FIG. 4. If the advance process has been performed for the print job, the processing advances to step S510, and, if not, the processing advances to step S511.

In step S510, the hold control unit 137 generates a print job by performing processing to add information of the advance process result to the PDL data. Details of the advance process result adding processing will be described later using FIG. 9. In step S511, the hold control unit 137 determines whether or not an advance process is being performed for the print job for which the print execution instruction was made. This determination may be a determination as to whether or not an advance process is being performed by referencing the bibliographic information similarly to determination in the foregoing step S509, and it may be a determination as to whether or not image data for which advance rendering processing was already performed that was associated with the bibliographic information in step S405 of FIG. 4 exists. If an advance process is being performed for the print job, the processing advances to step S512, and, if not, the processing advances to step S513.

In step S512, the hold control unit 137 interrupts the advance process for the print job for which the advance process is being performed. Information for interrupting the process is notified to the advance processing unit 136, and is used for the determination as to whether or not there is a cancel request as described in step S408. The hold control unit 137 obtains, as the advance process information, the advance process result that is saved in the HDD 124 at the point in time when the advance process was interrupted, and adds it to the print job as described in step S510.

In step S513, the print execution unit 138 executes finishing rendering processing. This processing is similar to step S303 in a case in which no advance process result information has been added. Meanwhile, in a case in which advance process result information has been added, the print execution unit 138 uses the advance process information that the advance process result indicates, and executes the remaining rendering processing. Note that in a case in which rendering processing has been executed in advance for all pages, the rendering processing is not executed in step S513. Continuing on, in step S514, the print execution unit 138 executes the print similarly to step S304, and ends this processing.

Page Deletion Processing

Figure 7:
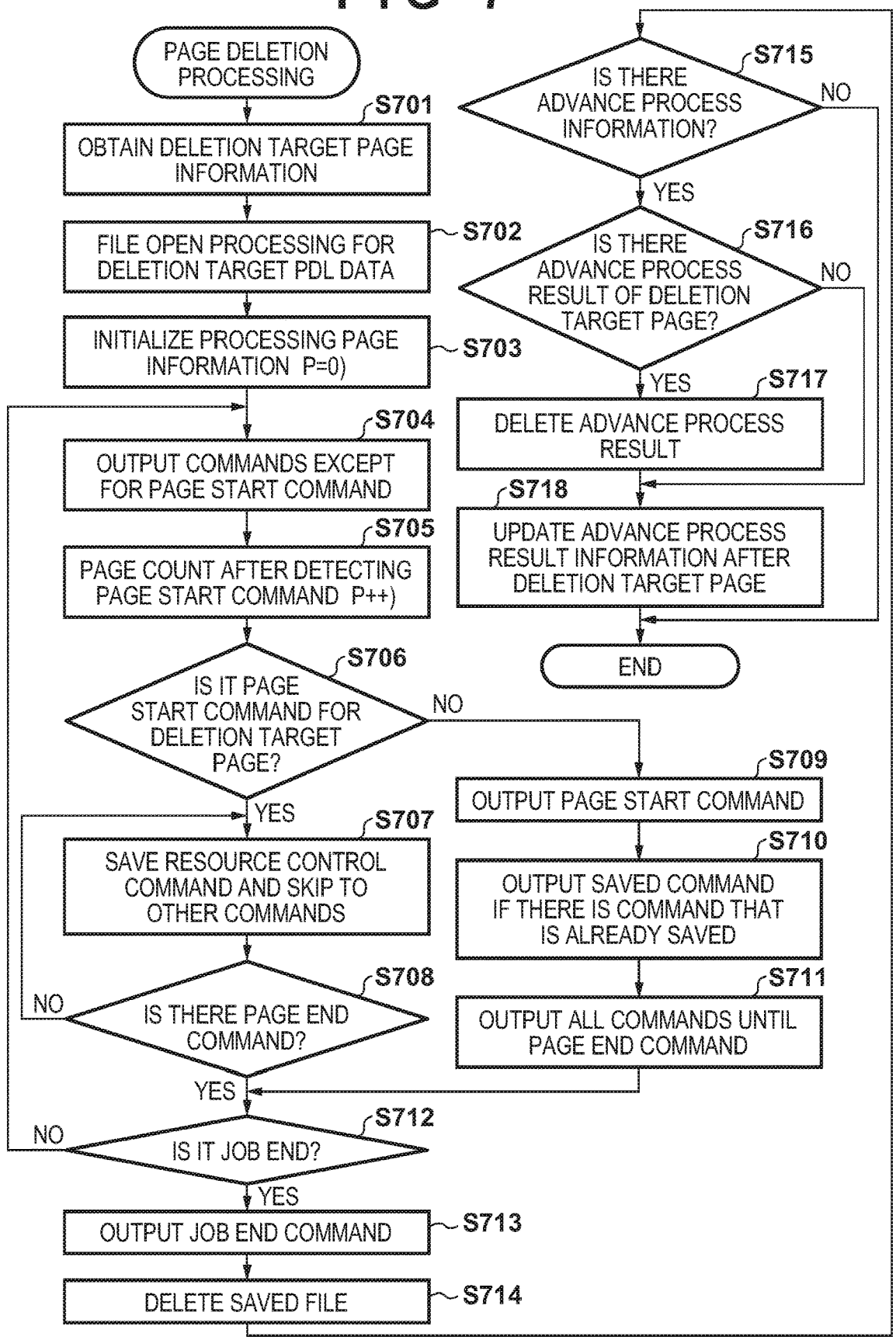
FIG. 7 is a flowchart for describing page deletion processing according to an embodiment.
Figure 8A:
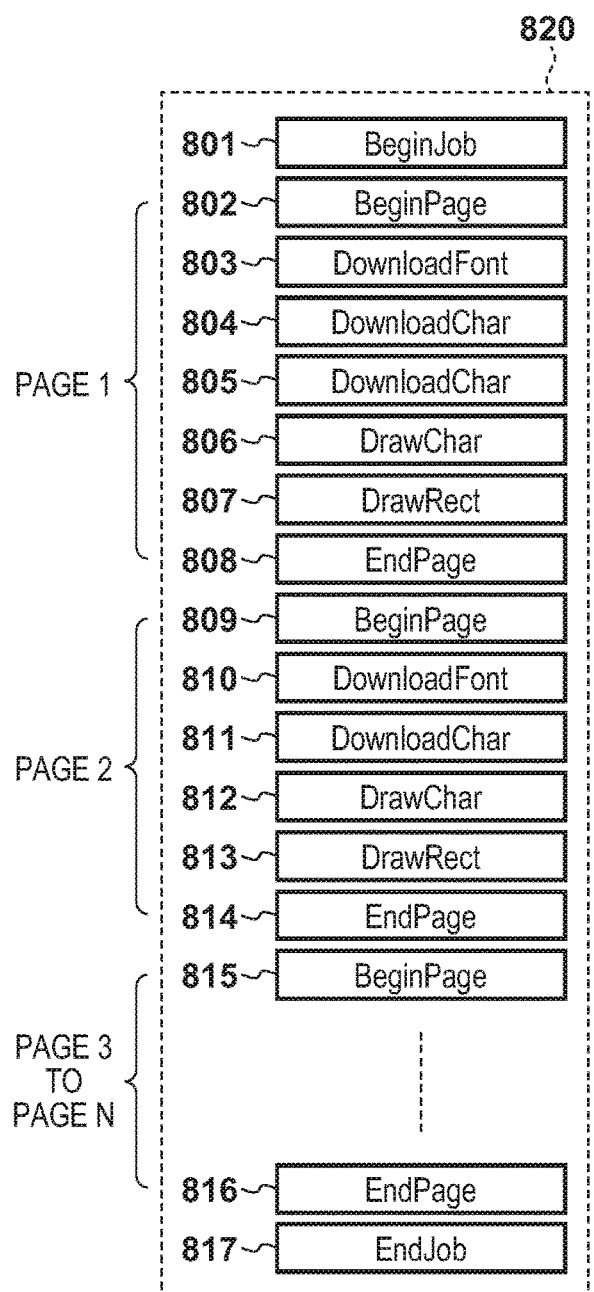
FIGS. 8A and 8B are views for describing page deletion processing according to an embodiment.
Figure 8B:
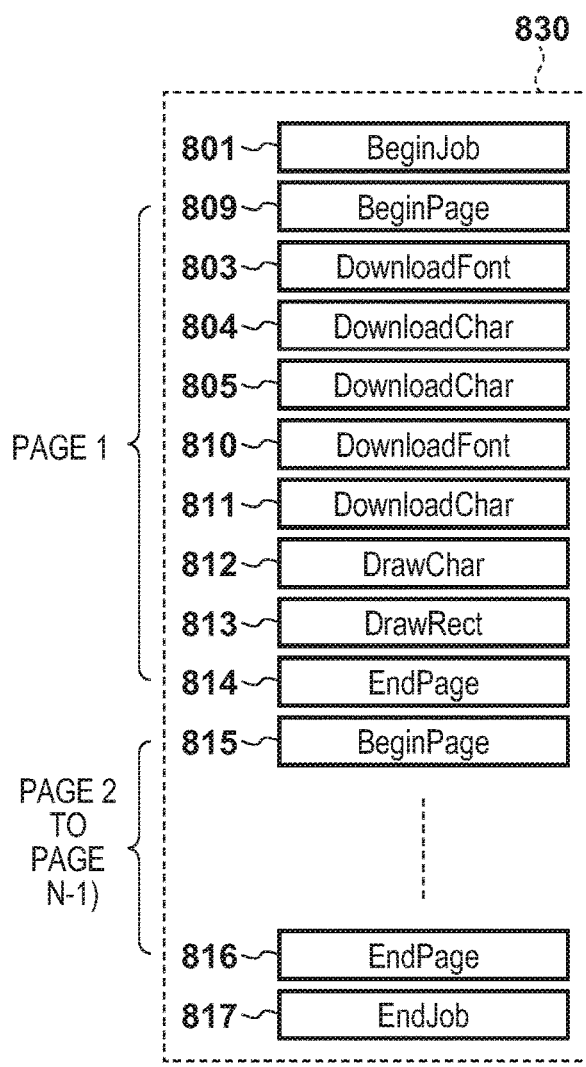

Next, with reference to FIG. 7, a processing procedure for page deletion processing that software (137, 141) that each controller 110 of the image forming apparatuses 101 to 103 according to the present embodiment comprises executes will be described. FIGS. 8A and 8B are views for describing an example of deleting a command when a page of PDL data is deleted. The processing described below is realized by, for example, the CPU 123 reading a control program that is stored in the ROM 126 or the HDD 124 into the RAM 125 and executing the program.

In step S701, the page deletion control unit 141 obtains the deletion target page information from the hold control unit 137. In the example of the present embodiment, a description will be given assuming that "1" was obtained as the page information. Continuing on, in step S702, the page deletion control unit 141 opens PDL data (reference numeral 820 of FIG. 8A for example) that the hold control unit 137 is storing so that the page deletion control unit 141 can access it as a file. Furthermore, in step S703, the page deletion control unit 141 initializes the processing page information "P" (P=0).

After that, in the processing from step S704, while referencing deletion target page information for each page included in the PDL data, page structure deletion processing is performed. Details of the page structure deletion processing will be described later using FIGS. 8A and 8B. FIG. 8A is PDL data 820 prior to deletion, and FIG. 8B is PDL data 830 after the first page is deleted.

First, in step S704, the page deletion control unit 141 analyzes the PDL data and outputs unchanged all commands up until detection of a "BeginPage" command, which is a page start command. In the present embodiment, the "BeginJob" command 801, which includes job information for PDL data, is output as is. Continuing on, in step S705, the page deletion control unit 141 counts processed page information after detection of the "BeginPage" command in step S704. If the "BeginPage" command 802 is detected for the first time, the page deletion control unit 141 sets "P=0+1=1", and determines that it is the first page.

In step S706, the page deletion control unit 141 determines whether the detected "BeginPage" command is for a deletion target page. In the present embodiment, since the "BeginPage" command 802 is determined to be the first page in step S705, and the deletion target page is "1" and matches the page number, the "BeginPage" command 802 is skipped in the reading, and the processing advances to step S707. In a case in which the processing advances and the detected command is a "BeginPage" command 809, similarly, the page count is set to (P=1+1=2) in step S705 and it is determined to be the second page, and, when, in step S706, it is determined not to be a deletion target page, the processing advances to step S709.

In step S707, the page deletion control unit 141 executes processing to skip a deletion target page in the reading. Drawing commands (in the example of FIG. 8B, the "DrawChar" command 806, which indicates character drawing, and the "DrawRect" command 807, which indicates rectangle drawing) are skipped in the reading and output is not performed therefor. Resource control commands (in the example of FIG. 8B, the "DownloadFont" command 803, which indicates font registration, and the "DownloadChar" commands 804 and 805, which indicates character registration) are, however, temporarily stored in a region of the HDD 124 or the RAM 125. The stored resource control command is output in step S709 if there is a next page. A reason for not skipping a resource control command in the reading is that a resource control command registers resource information once in the image forming apparatus, and information that is already registered may be reused in a following page in association with an ID, or the like. For this reason, the possibility that it will be used in a subsequent page, even though the corresponding page is deleted, is considered. Specifically, a resource control command includes information related to other pages, and, if it is deleted, it will affect printing of the other pages, and so it is necessary to leave such information.

In step S708, the page deletion control unit 141 determines that it is a page end command (the "EndPage" command 808 in the example of FIG. 8A). Here, if it is a page end command, it is determined that skipping up to the page end command has completed, and the processing advances to step S712, and, if not, the processing is returned to step S707.

Meanwhile, in step S709, the page deletion control unit 141 outputs a page start command "BeginPage" command 809 that is determined not to be for a deletion target page. Continuing on, in step S710, the page deletion control unit 141 confirms whether there is a resource control command that was saved in step S707, and, if there is one that was saved, outputs the resource control command. In the example of FIG. 8A, there are the "DownloadFont" command 803 and the "DownloadChar" commands 804 and 805. Also, in step S711, the page deletion control unit 141 outputs all commands until the page end command and the processing advances to step S712. In the example of FIG. 8A, there is the "DrawChar" command 812, the "DrawRect" command 813, and the "EndPage" command 814.

In step S712, the page deletion control unit 141 determines whether it is a job end command (in the example of FIGS. 8A and 8B, the "EndJob" command 817), and, when it determines that it is a job end command, the processing advances to step S713, and, if not, the processing is returned to step S704. In step S713, the page deletion control unit 141 outputs the job end command (the "EndJob" command 817). By the processing of steps S701 through S713, the PDL data 820 of FIG. 8A ends up being changed as in the PDL data 830 of FIG. 8B. In other words, from the PDL data 820, reference numerals 802 and 806 to 808 are deleted from out of the data corresponding to page 1.

Continuing on, in step S714, the page deletion control unit 141 deletes a resource control command that was saved in step S707 if one is left. This is because there are cases, such as those in which a resource control command is left in a case in which a deletion target page is the final page, though this is not the case in the description of the present embodiment.

Next, in step S715, the page deletion control unit 141 obtains the advance process information of the print job for which page deletion was performed from the hold control unit 137. If there is advance process information, the processing advances to step S716, and, if not, this processing is ended. In step S716, the page deletion control unit 141 determines whether or not there is an advance process result corresponding to the deletion target page of this flow in the advance process information obtained in step S715. If there is a corresponding advance process result, the processing advances to step S717, and, if not, the processing advances to step S718. In the case of the present embodiment, in a case in which the deletion target page is "1" and the page deletion target print job is the job of ID 1 illustrated in FIG. 3C, the advance process result corresponding to the deletion target page is "/xxx/yyy/image1", and, therefore, it is possible to determine that there is something that corresponds.

In step S717, the page deletion control unit 141 deletes the advance process result corresponding to the deletion target page. In the case of the present embodiment it is "/xxx/yyy/image1", and the advance process result is deleted. In step S718, the page deletion control unit 141 updates the information if there is an advance process result from the deletion target page onwards. In the case of the present embodiment, this corresponds to "/xxx/yyy/image9" of the job of ID 1 indicated in FIG. 3C, and the corresponding page information is updated as "/xxx/yyy/image8" in accordance with one page worth of PDL data being deleted. By this configuration, it is possible to prevent page misalignment in the advance process data. When the advance process result information update is finished, this processing is ended.

Addition Processing

Next, with reference to FIG. 9, a processing procedure of advance process result addition processing (step S510 of FIG. 5B) that the hold control unit 137 that the controller 110 of the image forming apparatuses 101 to 103 of the present embodiment comprises executes will be described. FIG. 10A is a view for describing an example of an advance process result to which PDL data was added by advance process result addition processing. The processing described below is realized by, for example, the CPU 123 reading a control program that is stored in the ROM 126 or the HDD 124 into the RAM 125 and executing the program.

In step S901, the hold control unit 137, as the start of processing for adding the advance process result to the PDL data, adds identifier information 1001. The identifier information indicates information for which the advance process result has been added, and it is sufficient that it be something by which it is possible to distinguish within the controller whether it is a character string or a numerical value.

Next, in step S902, the hold control unit 137 adds advance process information 1002 continuing from the identifier information added in step S901. The advance process information includes the data size for the entirety of the advance process results, the total number of pages of the target print job, page information for pages for which the advance process was performed, and the like. Regarding things such as data size and index information indicating the advance process result information that cannot be known until after later-described processing is performed, only a region for storing information is allocated, and the information is updated after the later-described processing. The configuration illustrated in reference numeral 1002 is only one example, and any configuration that collects information necessary for analyzing information of the advance process results may be used. In the example denoted by reference numeral 1002 is a print job example of the job ID 1 in the bibliographic information of FIG. 3C, and there is information of page ID "1" and page ID "9" as advance process results, and, therefore, information of "1" and "9" is stored in the advance process page information.

Next, in step S903, the hold control unit 137, continuing from the advance process information added in step S902, adds the advance process result information 1003. Specifically, the hold control unit 137 adds information in which something indicating the number of pages of the advance process results, something indicating the format, and something indicating information of the advance process results are made to be one set. In the example indicated by reference numeral 1003, information of the advance process results corresponding to the first page is added first, and then information of the file path at which the advance process results are stored is added. Note that in the case where the format is "file path," the hold control unit 137 adds information of the file path of the HDD 124 at which the advance process results are stored (information specifying the storage location of the advance process results) as the advance process result information.

Next, in step S904, the hold control unit 137 determines whether or not information of all pages for which the advance process has been completed has been added. Until the processing is performed for all of the pages, the processing of step S903 is repeated, and, after the processing ends, the processing advances to step S905. In step S905, the hold control unit 137 updates the advance process information generated in step S902. The hold control unit 137 overwrites the information after the processing ends in the region that was allocated in advance for index information indicating the data size of the advance process results overall, the information of the advance process results, and the like.

Next, in step S906, the hold control unit 137, continuing after the advance process results 1001, 1002, and 1003 generated in the processing up to step S905, adds PDL data 1004. As illustrated in reference numeral 1004, the PDL data is added in an original state without modification. After the end of step S906, the generation of the print job in which the advance process results and the PDL data are combined ends, and this processing ends.

Advance Processing Results after Page Deletion

Figure 10C:
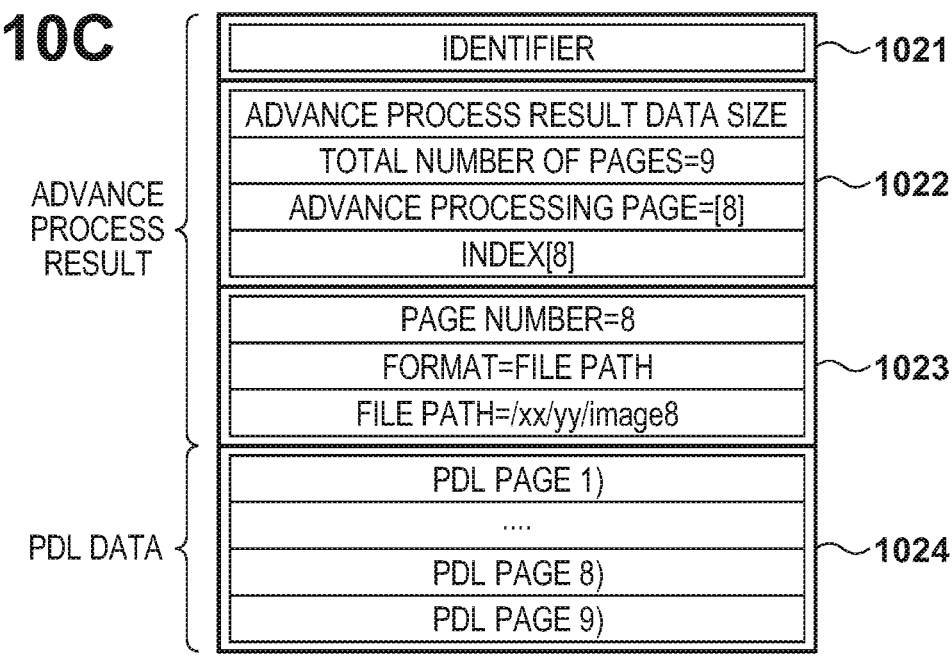

Here, to describe effects of the present embodiment, a description will be given using FIG. 10B and FIG. 10C for the advance process results that are added to the PDL data in a case in which the first page is deleted by the page deletion processing of FIG. 7. FIG. 10B illustrates an example of advance process results added to the PDL data in a case in which step S713 to step S716 of FIG. 7, which are features of the present embodiment, are not executed. In a case in which the first page is deleted by the processing of FIG. 7, the total number of pages is reduced by 1 from the original 10 to 9 (the total number of pages in reference numeral 1012), and since the first page is deleted in the PDL data 1014, the second page onward have page numbers reduced by 1. The advance process result 1013 retains a similar structure to FIG. 10A since it is not changed or deleted in a case in which the processing of step S713 to step S716 is not executed. Based on the description above, when the data structure of FIG. 10B is considered, the page number 1 of the advance process results corresponds to PDL (page 2) prior to the deletion, and the page number 9 is associated with PDL (page 10) prior to the deletion. Accordingly, the reference relation becomes incorrect, and it becomes impossible to obtain correct output results.

FIG. 10C illustrates an example of advance process results added to the PDL data in a case in which step S713 to step S716 are executed in relation to FIG. 10B. In a case in which the first page is deleted similarly to FIG. 10B, the total number of pages (the total number of pages in reference numeral 1022) and the first page of the PDL data 1024 are deleted. Additionally, by the processing of step S713 to step S716, the advance process result corresponding to the first page is deleted, and the advance process result 1023 is configured so that the advance process results corresponding to the page number 9 correspond to the page number 8. Accordingly, the page numbers are not shifted, the reference relation is correct, and it is possible to obtain a correct output result.

Figure 10D:
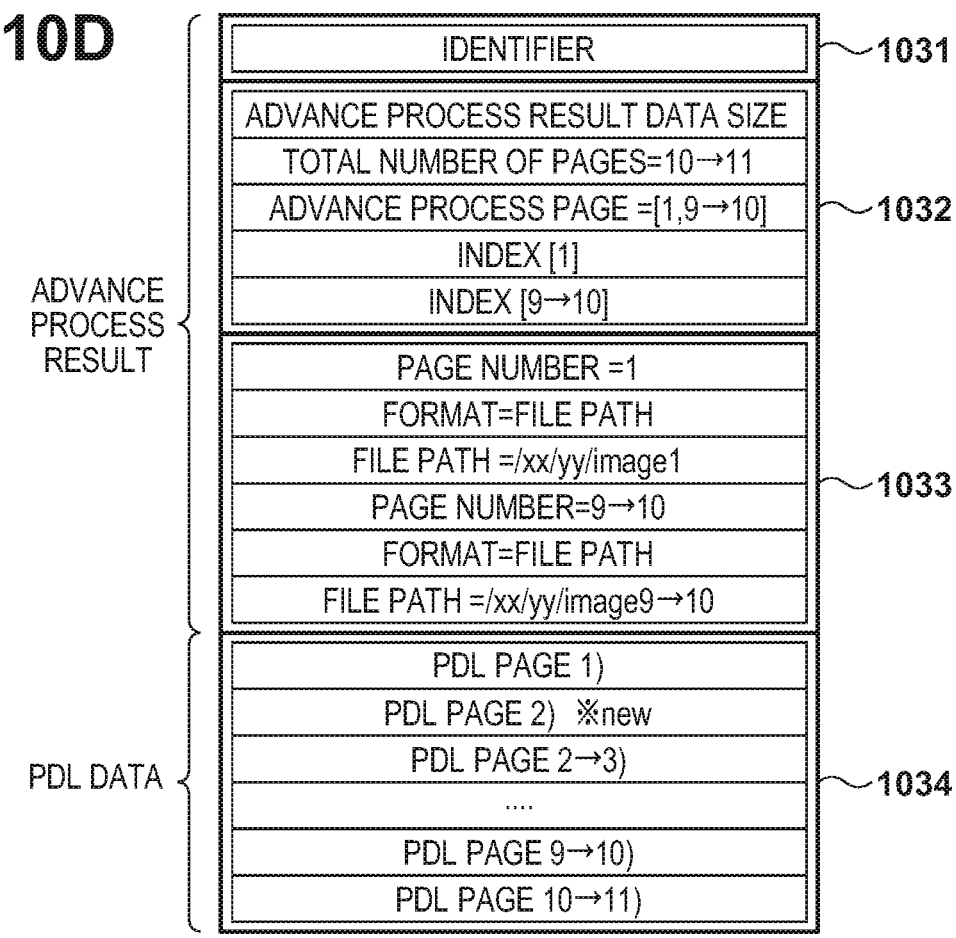

In the above-described example, an example of an advance process result when a subset of the pages are deleted is given, but an example of advance process results in which the number of pages is increased in the PDL data, such as when a blank page is inserted in the middle of the pages rather than page deletion, will be described using FIG. 10D. FIG. 10D illustrates an example in which one page is newly added as a blank page between the first page and the second page in relation to the PDL data of FIG. 10A. By increasing the PDL data by one page, the total number of pages in the reference numeral 1032 increases by one, and in a case in which there is page information from the added page in the index information corresponding to the advance process pages, 1 is added to that page information. In other words, with the example of FIG. 10D, the ninth page is changed to the tenth page. Furthermore, information of the page number and the file path in the reference numeral 1033 is changed in accordance with a change in the page information for the advance process pages (the page number 9 is changed to 10 in reference numeral 1033, and the file path is changed from image9 to image10). As in FIG. 10D, even when the number of pages increases due to the insertion of a blank page, or the like, by adjusting the page numbers in accordance with the increased number of pages, the reference relation becomes correct, and it is possible to obtain correct output results.

As described above, the image forming apparatus according to the present embodiment stores (holds) an image formation job, and, on the stored job, executes image processing in advance of performing the image formation, and stores the processing result, which is advance process information, in association with the stored job. Also, the image forming apparatus accepts setting information related to image formation for the stored job, and, if an instruction to delete a page is included in the setting information, the image formation data for the corresponding page is deleted from the stored job. Furthermore, the image forming apparatus, in accordance with the deleted page, updates the stored advance process information. In this way, in a case in which there is a page deletion instruction in relation to a print job being held, the image forming apparatus updates or deletes the advance process results simultaneously to page deletion corresponding to the PDL data (image formation data). In the present embodiment, since the advance process results are managed in association with pages, it is possible to prevent page shifting from occurring and to obtain correct output results by updating the advance process results in accordance with the page deletion instruction.

Second Embodiment

Below, a description will be given for a second embodiment of the present invention. In the present embodiment, description is given of a method for management by ID in which the advance process result was managed in association with the page in the bibliographic information in the foregoing first embodiment. Below, a description is omitted for configurations that are the same as in the foregoing first embodiment, and the description focuses on points that differ to the foregoing first embodiment.

Hold Processing

Next, with reference to FIGS. 11A and 11B, a processing procedure for print job hold processing that software (133 to 140) that each controller 110 of the image forming apparatuses 101 to 103 according to the present embodiment comprises executes will be described. The flowchart illustrating the content of the hold processing according to the present embodiment and the print job configuration example are similar to FIG. 3A and FIG. 3B respectively, and, therefore, the figure and description will be omitted.

The present embodiment is a processing procedure that is similar to the flowchart of FIG. 3A, but it differs in that the page management information 1101 is generated additionally when the bibliographic information is generated in step S307. Specifically, in step S307, the hold control unit 137 associates the user information obtained in step S305 and the print setting information and document name obtained in step S306. Then, the hold control unit 137 makes this associated information one record, and adds it to the bibliographic information corresponding to the user information.

FIG. 11A illustrates one example of bibliographic information of a user A. FIG. 11A, unlike FIG. 3C, has information indicating a table (for example, FIG. 11B) in which the page number of a print job is managed by an ID as the page management information 1101. Here, the bibliographic information of the user A is exemplified. The bibliographic information of the present embodiment comprises, for example, a job ID, file information, print setting information, a number of pages, a predicted amount of time for rendering, advance process information, page management information, and the like. Note that in the job ID, a unique value is set for each job. Also, the page management information 1101, as indicated in FIG. 11B, is something in which the IDs A, B, and the like, are added to the respective page numbers included in the print job, and for which ID management is performed by a table, which is generated when the bibliographic information is generated.

For example, as illustrated in FIG. 11B, "A" is associated with the first page as the ID, and B is associated with the second page as the ID in the management. Furthermore, based on the page management information 1101, the advance process results of the advance process information are managed based on the ID. For example, as information indicating the save destination for the advance process results, a file name including the management ID is given, as indicated by "/xxx/yyy/imageA", "xxx/yyy/imageI", and the like. In such cases, imageA indicates that it is the first page, and imageI indicates that it is the ninth page.

Advance Processing

Figure 12:
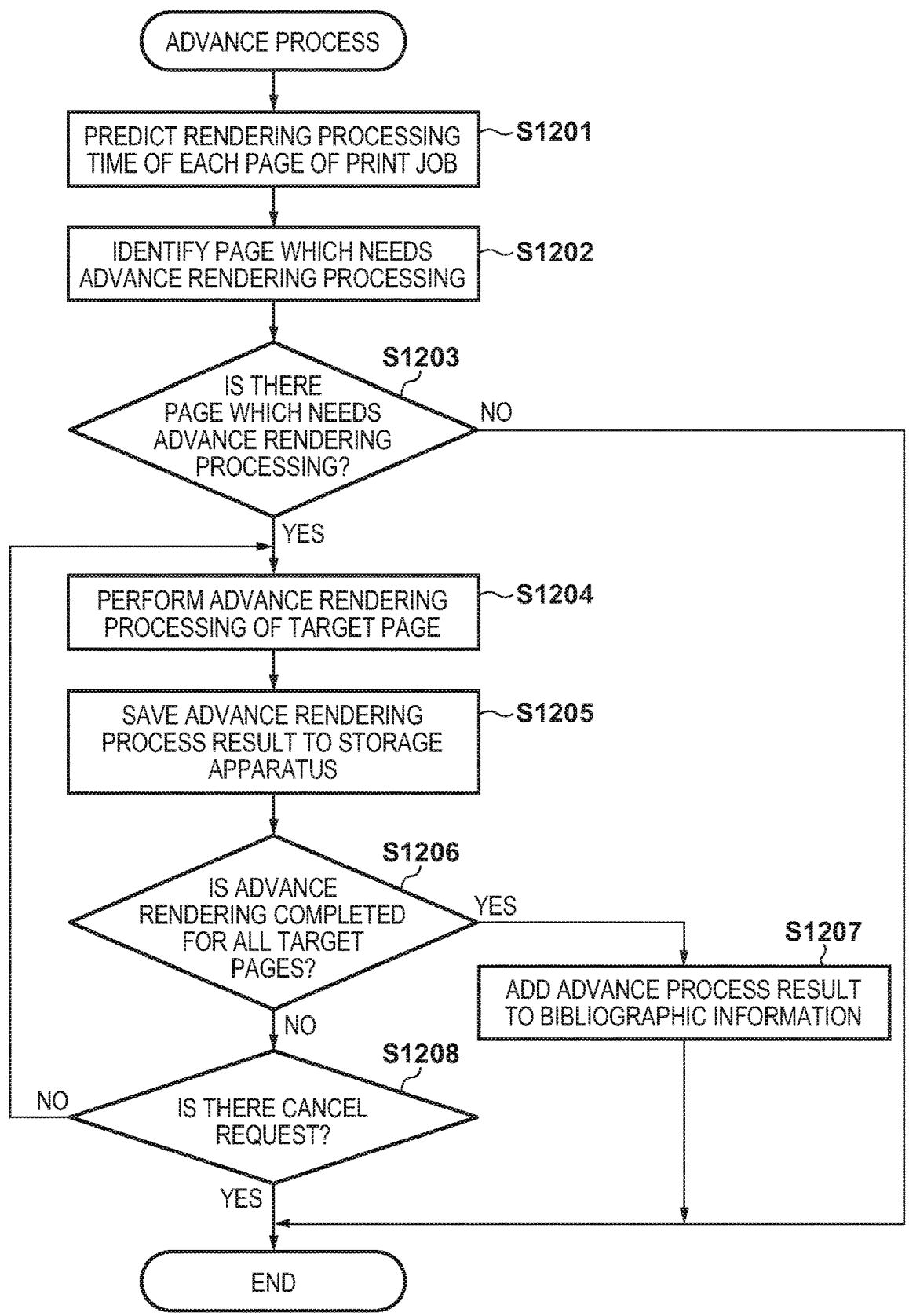
FIG. 12 is a flowchart for describing an advance process according to an embodiment.

Next, with reference to FIG. 12, a processing procedure for advance processing that software (135, 136) that each controller 110 of the image forming apparatuses 101 to 103 according to the present embodiment comprises executes will be described. This advance process of FIG. 12 is processing that is executed after a print job is held in the HDD 124 by the print job hold processing of FIGS. 11A and 11B. The processing described below is realized by, for example, the CPU 123 reading a control program that is stored in the ROM 126 or the HDD 124 into the RAM 125 and executing the program. Step S1201 to step S1206 and step S1208 are processes that are similar to step S401 to step S406 and step S408 and so, a description thereof is omitted.

In step S1207, the advance processing unit 136 instructs the bibliographic management unit 133 and adds save information for the results of the advance process executed in step S1205 (processing content similar to step S405) to the corresponding bibliographic information. For example, as in the advance process information in the bibliographic information of FIG. 11A, the information "done" as to whether or not the advance process has completed, and the information "/xxx/yyy/imageA" and "/xxx/yyy/imageI," and the like, about where the results of the advance process are stored are added. In the present embodiment, since the advance process images for the first page and the ninth page are generated, the advance process results are saved with file names in which the ID information (A and I) linked with each page is added from the table of the page management information 1101.

Page Deletion Processing

Next, with reference to FIG. 13, a processing procedure for page deletion processing that software (137, 141) that each controller 110 of the image forming apparatuses 101 to 103 according to the present embodiment comprises executes will be described. This view for describing an example of deleting a command when a page of PDL data is deleted is similar to FIGS. 8A and 8B. The processing described below is realized by, for example, the CPU 123 reading a control program that is stored in the ROM 126 or the HDD 124 into the RAM 125 and executing the program. Step S1301 to step S1314 are processes that are similar to step S701 to step S714 and so, a description thereof is omitted.

In step S1315, the page deletion control unit 141 updates the page management information 1101 in accordance with the deleted page. Updating of the page management information 1101 when the deletion target page is "1" is described using FIGS. 14A to 14C. There is ten pages worth of page management information 1101 as illustrated in FIG. 14A, and, in a case in which the first page is deleted, information of "ID: A" corresponding to the first page is deleted. Furthermore, the second page, which corresponds to "ID: B," becomes the first page in accordance with the deletion. As a result, the ID management information for each page will be shifted by one respectively, and ultimately FIG. 14B will result. FIG. 14C will be described later.

Addition Processing

Figure 15:
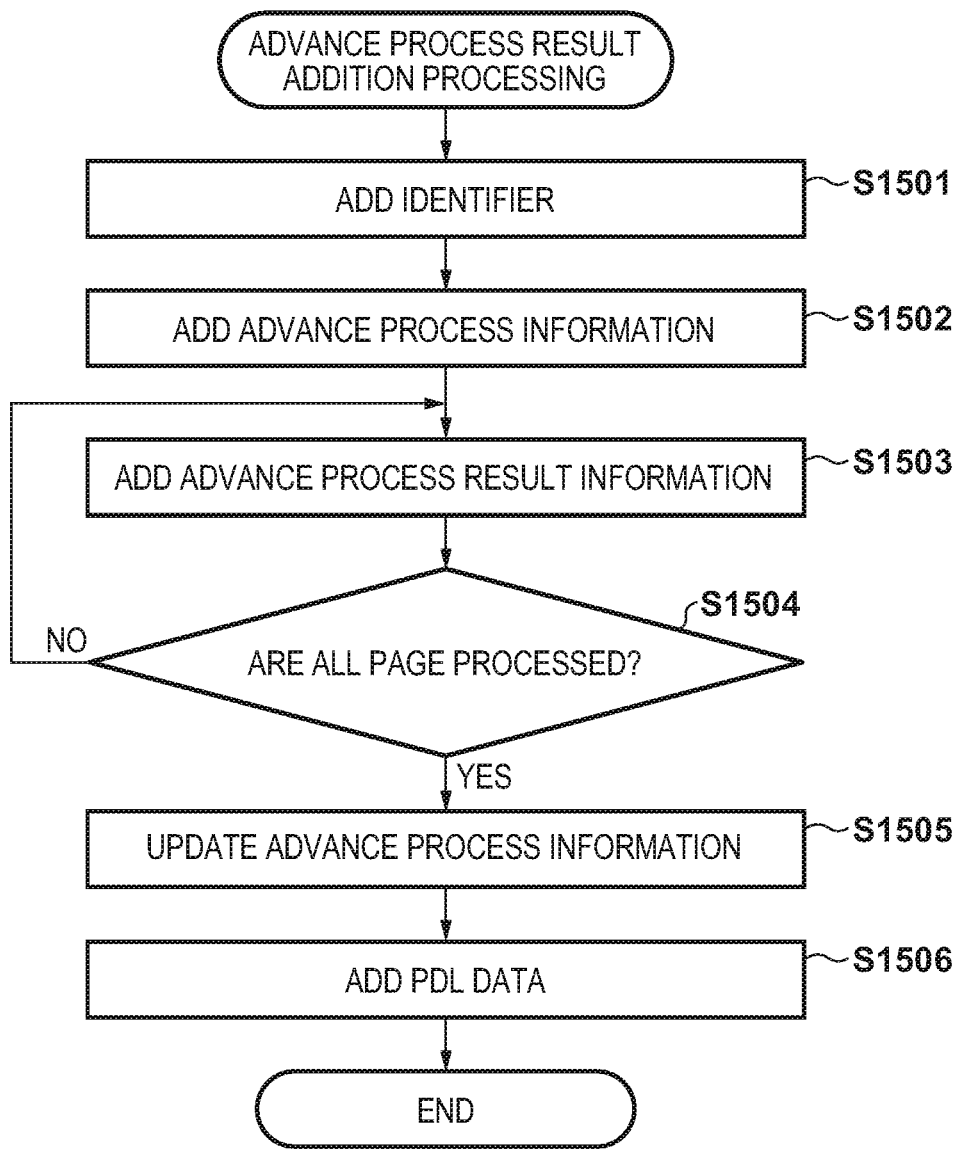
FIG. 15 is a flowchart for describing advance process result addition processing according to an embodiment.
Figure 16A:
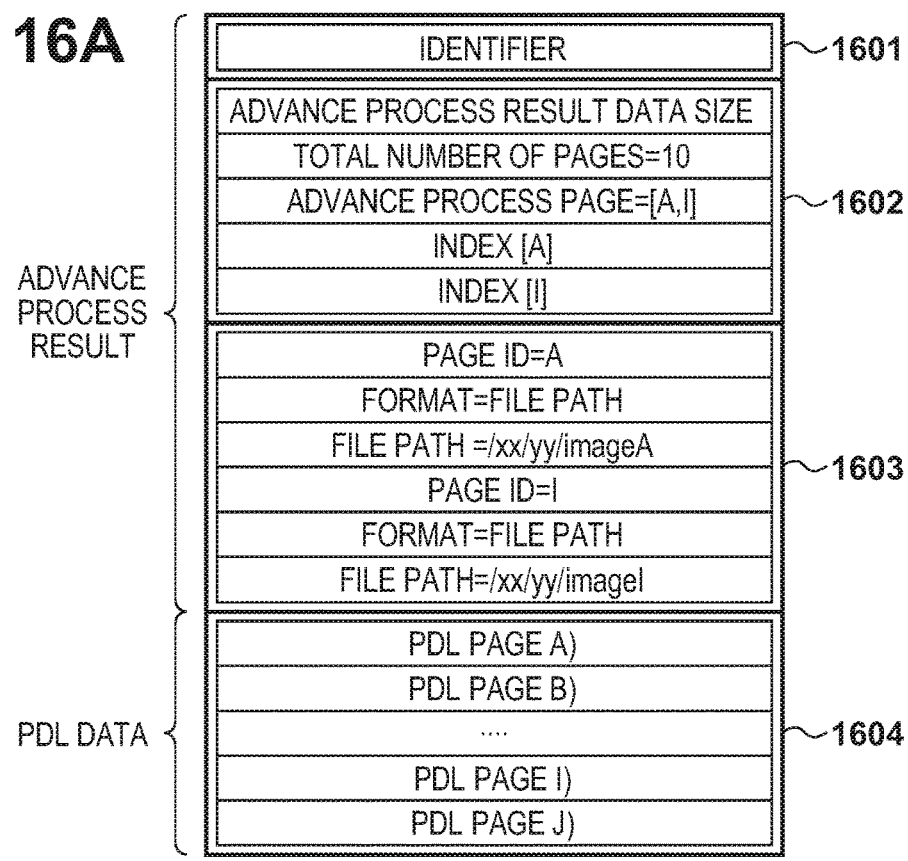
FIGS. 16A to 16C are views for describing a print job after adding an advance process result according to an embodiment.

Next, with reference to FIG. 15, a processing procedure of advance process result addition processing that the hold control unit 137 that the controller 110 of the image forming apparatuses 101 to 103 according to the present embodiment comprises executes will be described. FIG. 16A is a view for describing an example of an advance process result to which PDL data was added by advance process result addition processing. The processing described below is realized by, for example, the CPU 123 reading a control program that is stored in the ROM 126 or the HDD 124 into the RAM 125 and executing the control program.

Step S1501 is processing similar to step S901, and so, a description is omitted. Next, in step S1502, the hold control unit 137 adds advance process information 1602 continuing from the identifier information added in step S1501. The advance process information 1602 includes the data size for the entirety of the advance process result, the total number of pages of the target print job, page information for pages for which the advance process was performed, and the like. Regarding things such as data size and index information indicating the advance process result information that cannot be known until after later-described processing is performed, only a region for storing information is allocated, and the information is updated after the later-described processing. The configuration illustrated in reference numeral 1602 is only one example, and any configuration that collects information necessary for analyzing information of the advance process results may be used. In the example denoted by reference numeral 1602 is a print job example of the job ID 1 in the bibliographic information of FIG. 11A, and there is information of page ID "A" and page ID "I" as advance process results, and, therefore, information of "A" and "I" is stored in the advance process page information.

In step S1503, the hold control unit 137, continuing from the advance process information added in step S1502, adds the advance process result information 1603. Information in which something indicating the page ID of the advance process result, something indicating the format, and something indicating information of the advance process result are added as one set. In the example indicated by reference numeral 1603, information of the advance process results corresponding to the page ID "A" is added first, and information of the file path at which the advance process results are stored is added. Note that in a case in which the format is "file path", the hold control unit 137 adds information of the file path of the HDD 124 at which the advance process results are stored (information specifying the storage location of the advance process results) as the advance process result information.

In step S1504, the hold control unit 137 determines whether or not information of all pages for which the advance process has been completed has been added. Until the processing is performed for all of the pages, the processing of step S1503 is repeated, and, after the processing ends, the processing advances to step S1505. In step S1505, the hold control unit 137 updates the advance process information generated in step S1502. The information after the processing ends is written over the region that was allocated in advance for index information indicating the data size of the advance process results overall, the information of the advance process results, and the like.

Next, in step S1506, the hold control unit 137 continuing after the advance process results (1601, 1602, and 1603) generated in the processing up to step S1505, adds PDL data (1604). As illustrated in 1604, the PDL data is added in an original state without modification. In the example illustrated in reference numeral 1604, the page number is denoted by ID "A", "B" and the like, but these are mapped using the table of the page management information 1101 in FIG. 11B. After the end of step S1506, the generation of the print job in which the advance process results and the PDL data are combined ends, and this processing ends.

Advance Processing Results after Page Deletion

Here, to describe effects of the present embodiment, a description will be given using FIGS. 16A to 16C for the advance process results that are added to the PDL data in a case in which the first page is deleted by the page deletion processing of FIG. 13.

Figure 13:
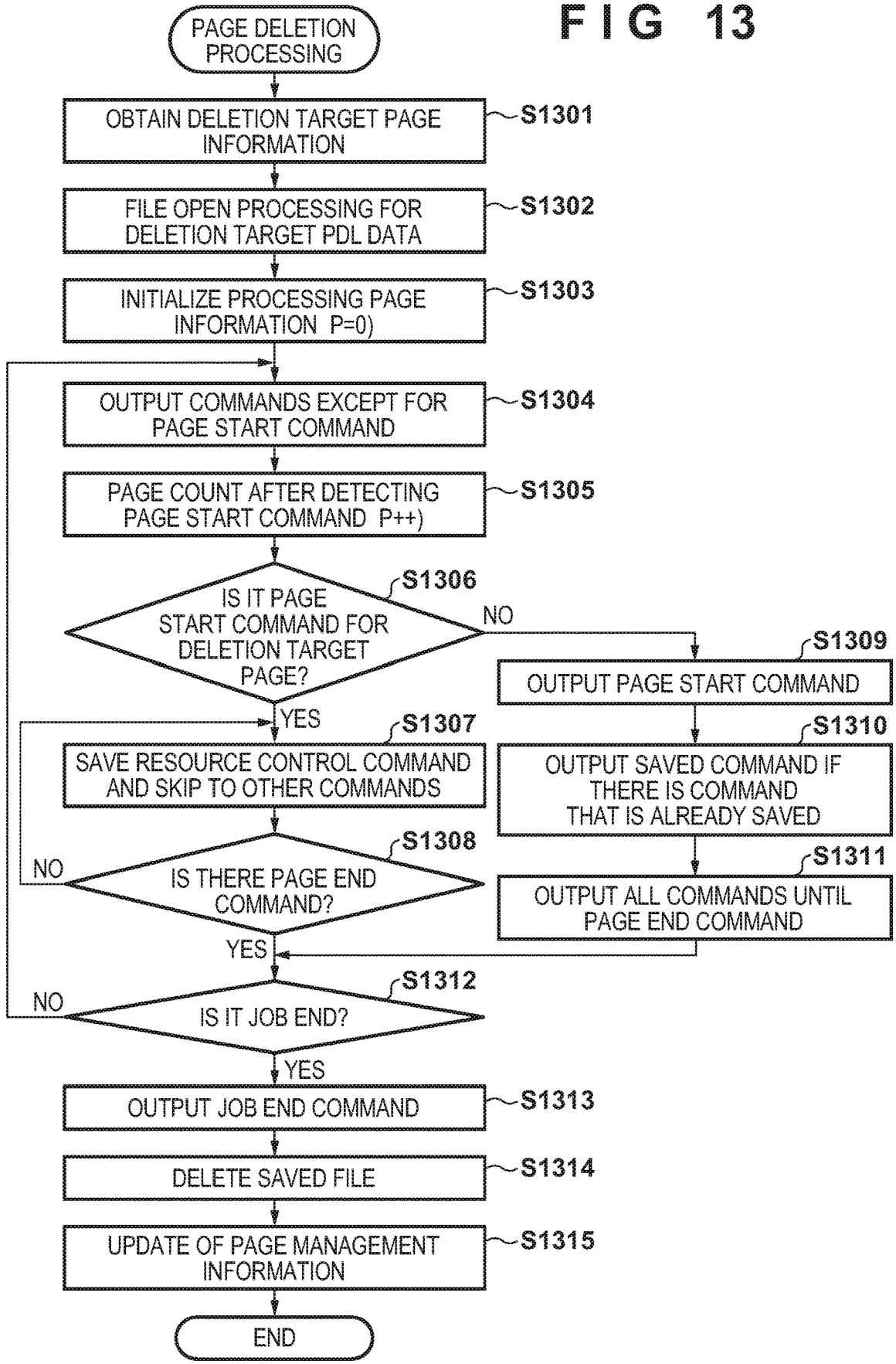
FIG. 13 is a flowchart for describing page deletion processing according to an embodiment.
Figure 16B:
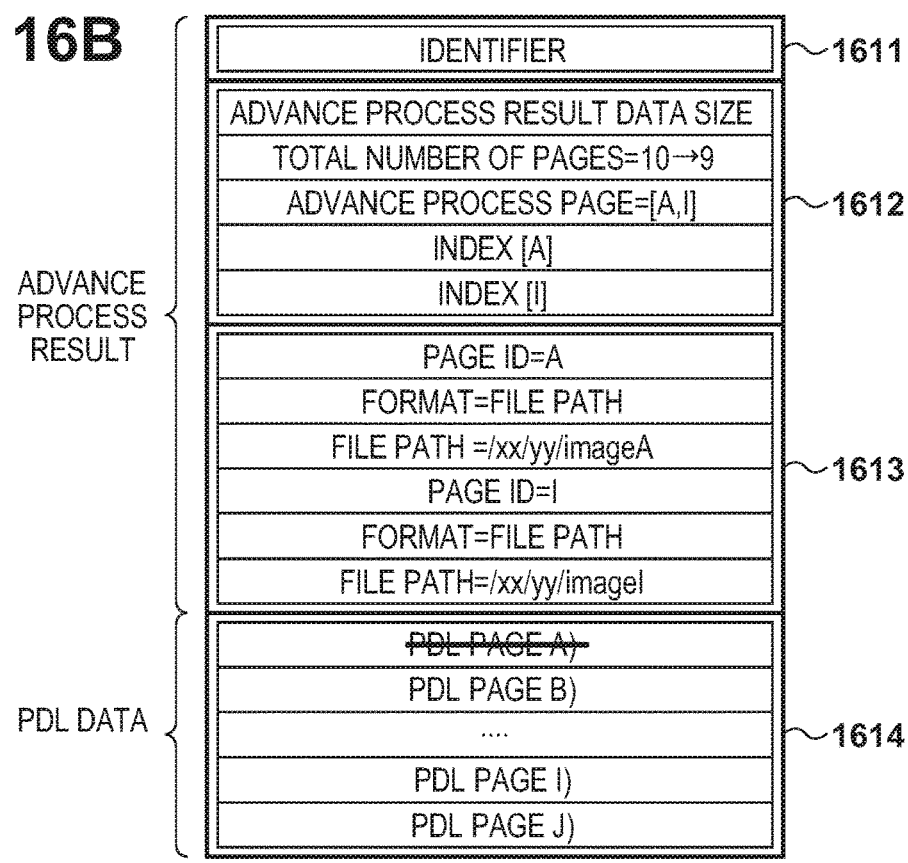
Figure 16C:
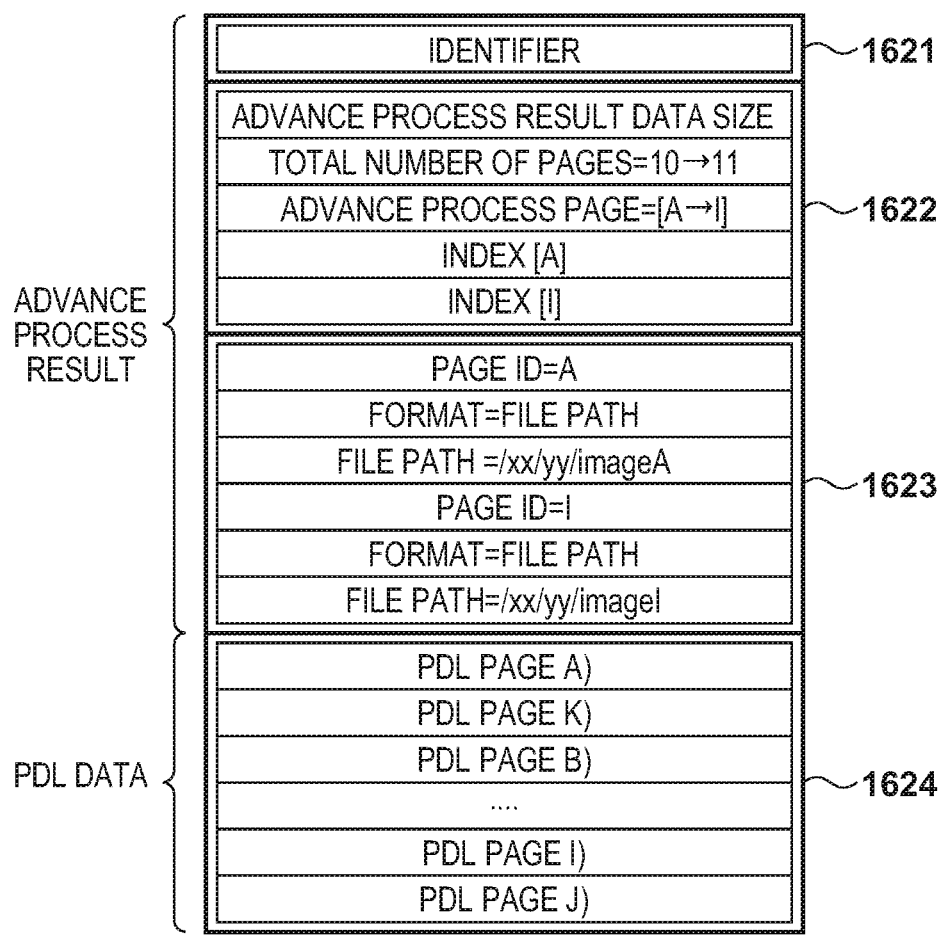

FIG. 16B represents an advance process result of a case in which the first page is deleted in the page deletion processing of FIG. 13 in the present embodiment. By the first page being deleted, the page whose page ID is "A" corresponding to the first page in reference numeral 1614 is deleted. Also, the total number of pages in the advance process result 1612 is changed to decrease from "10" to "9". The result of this is that, in relation to the page IDs "A" and "I" for which the advance process result is stored as the advance process page, it can be seen that the information of the page ID "A" becomes unneeded, and the information of the page ID "I" can be correctly referenced without the association relationship changing. In the foregoing first embodiment, it was necessary that the advance process results change in accordance with the deleted page after page deletion. By managing the print job page information/advance process result by using the page ID as in the present embodiment, however, it ceases to be necessary to be aware of an advance process result when a page is deleted.

Page Insertion

In the above-described example, an example of an advance process result when a subset of the pages are deleted is given, but cases in which the number of pages increase, such as when a blank page is inserted in the middle of pages, rather than a page deletion, can be envisioned. An example of advance process results added to PDL data in such cases is described using FIG. 14C and FIG. 16C. FIG. 16C illustrates an example in which one page is newly added as a blank page between the first page (page ID "A") and the second page (page ID "B") in relation to the PDL data of FIG. 16A. The added page corresponds to page ID "K" in FIG. 16C.

By adding one page to the PDL data, the page management information 1101 becomes as in FIG. 14C. In other words, the ID corresponding to the second page becomes "K" and the subsequent page information is increased by 1. As a result, the total number of pages in the reference numeral 1622 increases by one since the PDL data increases by one page, but it is not necessary to repair other reference relationships by managing the print job page information/advance process results by using page IDs.

As described above, the image forming apparatus according to the present embodiment, unlike in the foregoing first embodiment, manages print job page information as the page management information 1101 by using page IDs, and manages advance process results also by using page IDs. Accordingly, if the page management information 1101 is updated in accordance with a page that was deleted when a page deletion is executed, association is possible without changing information of the advance process result.

Variations

The present invention is not limited to the embodiments described above, and various variations are possible. For example, in the above described first and second embodiments, a description was given of a configuration for deleting advance process data in addition to PDL data in accordance with a delete instruction. Cases in which the advance process is performed for the deleted data once again are, however, envisioned. For example, cases in which the instruction to delete these was a mistake, and cases in which the user wishes to recover a page for which a delete instruction was made are possible. In such cases, it is not possible to recover such data in a case in which the target data of the delete instruction was deleted completely, as in the foregoing first and second embodiments. Accordingly, it is desirable to save such deleted data in a separate region to handle such cases. Alternatively, a configuration may be taken so as to delete only the advance process data and to save the print data in a separate region and to use it only in a case in which the advance process is performed once again. Specifically, the data is temporarily saved to a separate region, and in a case in which an instruction to add it once again is accepted, it is possible to perform the addition by using the saved data. Note that in the case of saving to a separate region, since there is a concern about memory resource depletion control may be performed to completely delete data after a predetermined time has elapsed since the saving.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

By virtue of the present invention, in hold printing, print processing time from when a print instruction is made by a user can be shortened and advance rendering image page numbers can be managed correctly even in a case where a particular page of a print job is deleted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A printing apparatus comprising:
(A) a storage device;
(B) at least one memory that stores a set of instructions; and
(C) at least one processor that executes the instructions to cause the printing apparatus to perform operations comprising:
   (a) receiving a print job including page description language (PDL) data from an external apparatus and storing the received print job in the storage device;
   (b) predicting a processing time of rendering processing for each page of the print job in response to the received print job being stored in the storage device;
   (c) determining one or more pages for which page image data is to be generated in advance based on the predicted processing time;

(d) interpreting, in a case in which the one or more pages are determined for which the page image data is to be generated in advance, the PDL data included in the received print job;

(e) generating the page image data corresponding to the determined one or more pages;

(f) storing correspondence information in association with the print job, the correspondence information associating the generated page image data with identification information identifying a location of a page;

(g) accepting a user operation for deleting one or more specified pages from the print job; and (h) in response to accepting the user operation for deleting the one or more specified pages from the print job, (1) deleting a rendering command for constructing the one or more specified pages from the print job, and (2) updating the identification information included in the correspondence information based on the one or more specified pages.

2. The printing apparatus according to claim 1, wherein, in the updating, identification information corresponding to page image data determined to be located after the one or more specified pages is updated based on identification information for identifying a location of a page.

3. The printing apparatus according to claim 2, wherein the identification information is a page number, and, in the updating, a page number located after the one or more specified pages is decreased by the number of pages of the one or more specified pages.

4. The printing apparatus according to claim 1, wherein the operations further comprise (i) deleting the page image data in a case in which the page image data corresponding to the one or more specified pages has been previously generated.

5. The printing apparatus according to claim 1, wherein the operations further comprise:

(i) selectably displaying, on a display device, a list of print jobs stored in the storage device and linked to user information of a user that logged into the printing apparatus;

(j) displaying, on the display device, for each page, a preview image for a print job that was selected via the list; and (k) accepting a user operation for deleting the one or more specified pages corresponding to the selected preview image.

6. The printing apparatus according to claim 1, wherein, in a case in which printing based on a print job is executed and the correspondence information is associated with the received print job, (1) for a page determined to be generated in advance based on the correspondence information, printing using the page image data generated in advance is executed, and, (2) for a page determined not to be generated in advance based on the correspondence information, PDL data included in the received print job is interpreted and printing using page image data obtained by a result of interpreting is executed.

7. A method of controlling a printing apparatus, the method comprising:

receiving a print job including page description language (PDL) data from an external apparatus and storing the received print job in a storage device;

predicting a processing time of rendering processing for each page of the print job in response to the received print job being stored in the storage device;

determining one or more pages for which page image data is to be generated in advance based on the predicted processing time;

interpreting, in a case in which the one or more pages are determined for which the page image data is to be generated in advance, the PDL data included in the received print job;

generating the page image data corresponding to the determined one or more pages;

storing correspondence information in association with the print job, the correspondence information associating the generated page image data with identification information identifying a location of a page;

accepting a user operation for deleting one or more specified pages from the print job; and in response to accepting the user operation for deleting the one or more specified pages from the print job, (a) deleting a rendering command for constructing the one or more specified pages from the print job, and (b) updating the identification information included in the correspondence information based on the one or more specified pages.

8. The method according to claim 7, wherein, in the updating, identification information corresponding to page image data determined to be located after the one or more specified pages is updated based on identification information for identifying a location of a page.

9. The method according to claim 8, wherein the identification information is a page number, and, in the updating, a page number located after the one or more specified pages is decreased by the number of pages of the one or more specified pages.

10. The method according to claim 7, further comprising deleting the page image data in a case in which the page image data corresponding to the one or more specified pages has been previously generated.

11. The method according to claim 7, further comprising:

selectably displaying, on a display device, a list of print jobs stored in the storage device and linked to user information of a user that logged into the printing apparatus;

displaying, on the display device, for each page, a preview image for a print job that was selected via the list; and accepting a user operation for deleting the one or more specified pages corresponding to the selected preview image.

12. The method according to claim 7, wherein, in a case in which printing based on a print job is executed and the correspondence information is associated with the received print job, (1) for a page determined to be generated in advance based on the correspondence information, printing using the page image data generated in advance is executed, and, (2) for a page determined not to be generated in advance based on the correspondence information, PDL data included in the received print job is interpreted and printing using page image data obtained by a result of interpreting is executed.

13. A non-transitory computer-readable storage medium storing a computer program for causing a computer to execute a method of controlling a printing apparatus, the method comprising:

receiving a print job including page description language (PDL) data from an external apparatus and storing the received print job in a storage device;

predicting a processing time of rendering processing for each page of the print job in response to the received print job being stored in the storage device;

determining one or more pages for which page image data is to be generated in advance based on the predicted processing time;

interpreting, in a case in which the one or more pages are determined for which the page image data is to be generated in advance, the PDL data included in the received print job;

generating the page image data corresponding to the determined one or more pages;

storing correspondence information in association with the print job, the correspondence information associating the generated page image data with identification information identifying a location of a page;

accepting a user operation for deleting one or more specified pages from the print job; and in response to accepting the user operation for deleting the one or more specified pages from the print job, (a) deleting a rendering command for constructing the one or more specified pages from the print job, and (b) updating the identification information included in the correspondence information based on the one or more specified pages.

14. The non-transitory computer-readable storage medium according to claim 13, wherein, in the updating, identification information corresponding to page image data determined to be located after the one or more specified pages is updated based on identification information for identifying a location of a page.

15. The non-transitory computer-readable storage medium according to claim 14, wherein the identification information is a page number, and, in the updating, a page number located after the one or more specified pages is decreased by the number of pages of the one or more specified pages.

16. The non-transitory computer-readable storage medium according to claim 13, wherein the method further comprises deleting the page image data in a case in which the page image data corresponding to the one or more specified pages has been previously generated.

17. The non-transitory computer-readable storage medium according to claim 13, wherein the method further comprises:

selectably displaying, on a display device, a list of print jobs stored in the storage device and linked to user information of a user that logged into the printing apparatus;

displaying, on the display device, for each page, a preview image for a print job that was selected via the list; and accepting a user operation for deleting the one or more specified pages corresponding to the selected preview image.

18. The non-transitory computer-readable storage medium according to claim 13, wherein, in a case in which printing based on a print job is executed and the correspondence information is associated with the received print job, (1) for a page determined to be generated in advance based on the correspondence information, printing using the page image data generated in advance is executed, and, (2) for a page determined not to be generated in advance based on the correspondence information, PDL data included in the received print job is interpreted and printing using page image data obtained by a result of interpreting is executed.

* * * * *